(12) United States Patent
Beshai et al.

(10) Patent No.: US 7,450,845 B2
(45) Date of Patent: Nov. 11, 2008

(54) EXPANDABLE UNIVERSAL NETWORK

(75) Inventors: Maged E. Beshai, Stittsville (CA); Bilel N. Jamoussi, Nashua, NH (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1066 days.

(21) Appl. No.: 10/316,557

(22) Filed: Dec. 11, 2002

(65) Prior Publication Data

US 2004/0114539 A1     Jun. 17, 2004

(51) Int. Cl.
*H04J 14/00* (2006.01)
*H04J 4/00* (2006.01)
*H04L 12/28* (2006.01)

(52) U.S. Cl. ............................. 398/47; 398/50; 398/75; 370/351

(58) Field of Classification Search ............. 398/47–51, 398/79, 75, 71; 370/351, 360, 370
See application file for complete search history.

(56) References Cited

U.S. PATENT DOCUMENTS 5,351,146 A * 9/1994 Chan et al. .................... 398/58
6,768,827 B2 * 7/2004 Yoo ............................. 385/14
7,209,975 B1 * 4/2007 Zang et al. .................. 709/238
2002/0024690 A1 * 2/2002 Iwaki et al. ................. 359/110
2003/0185205 A1 * 10/2003 Beshai ........................ 370/370
2007/0171900 A1 * 7/2007 Beshai et al. ............... 370/380

* cited by examiner

*Primary Examiner*—Shi K Li
*Assistant Examiner*—Nathan M Curs
(74) *Attorney, Agent, or Firm*—Anderson Gorecki & Manaras LLP

(57) ABSTRACT

A wide-coverage high-capacity network that scales to multiples of petabits per second is disclosed. The network comprises numerous universal edge nodes interconnected by numerous disjoint optical core connectors of moderate sizes so that a route set for any edge-node-pair includes routes each of which has a bounded number of hops. A core connector can be a passive connector, such as an AWG (arrayed wave-guide grating) device, or an active connector such as an optical channel switch or an optical time-shared channel switch. The core capacity is shared. Thus, failure of a proportion of core connectors reduces network connectivity but does not result in a major service discontinuity. The network uses a source routing scheme where a set of candidate routes for each node pair is determined from the network topology and the candidate routes for a node pair are sorted according to their differential propagation delays. A method of measuring the differential propagation delay is also disclosed.

19 Claims, 24 Drawing Sheets

EXPANDABLE UNIVERSAL NETWORK

FIELD OF THE INVENTION

The present invention relates to network configuration. In particular, it is directed to a network that starts with static optical connectors and graduates to optical switches operated in a channel-switching mode, then to fast optical switches operated in a time-division-multiplexing mode.

BACKGROUND OF THE INVENTION

Network expansion is motivated by the prospects of new applications requiring a much higher capacity than that required by today's applications and is facilitated by the abundance of data transport capacity (often called bandwidth) of the optical telecommunication's medium. The realizable capacity of a telecommunication network is virtually unlimited. A network structure that enables virtually unlimited expansion while providing a high service quality is desirable and its introduction is overdue.

One of the tempting options to provide a high-capacity wide-coverage telecommunication network is to build on an existing structure. Two great network structures with global coverage already exist. The first is the almost flawless global telephone network. The second is the Internet. Neither, however, is a candidate for expansion to the needed capacity or capability. The telephone network's rigid circuit switching and huge infrastructure make it almost impossible to upgrade to carry data at high rates. The structure of the current Internet prohibits its growth without tremendous complexity and expense. This is further complicated by the unduly complex protocols that are an accumulation of patchwork performed since the Internet's inception.

In the pursuit of simplicity, one must resist a common ill-conceived notion that bandwidth is inexpensive and, hence, may be squandered to simplify control. The fallacy of this belief is twofold. Firstly, squandering bandwidth to solve a problem shifts the problem somewhere else because, eventually, the data content has to be sifted to retain the required information and, secondly, while the cost of communicating a data unit may drop significantly, the volume of communicated data is also likely to increase significantly.

Network Basics

In its simplest form, a network comprises a large number, P, of dual access ports. A dual port consists of an input port and an output port. A network user can access the network through a single port or through more than one port, and a port can support several network users. The ports can have different capacities, each operating at a different bit rate, for example a 2.5 Gigabits a second (Gb/s) or 10 Gb/s bit rate. The network user need not be aware of the network structure beyond the access ports.

The network provider's problem is to interconnect the P ports. Establishing a permanent path from each port to each other port is clearly unrealizable when P is a large number; 10 million for example. Interconnecting the P ports by a central core node is also unrealizable for a large value of P. For a practical solution, the ports can be divided into port groups, and each port group forms a node, called an edge node. An edge node consists of a source node that receives traffic from the input ports and a sink node that delivers traffic to the output ports. The source node and sink node preferably share memory and control. To form a network, the edge nodes can be interconnected directly or through core nodes, each core node would have a substantially higher capacity than a typical edge node.

The outer capacity of the network is the total capacity of its P ports. The outer capacity is the capacity available to the network users. For a given outer capacity, the use of a large number of low-capacity edge nodes has the advantage of reducing access cost, by virtue of the resulting proximity of the edge nodes to the network users, and reducing nodal complexity, by virtue of the node size. For a large network, with the number of ports P exceeding tens of thousands, the disadvantages of using low capacity inter-connecting nodes outweigh the advantages. While the nodal complexity is reduced, the network complexity is increased. Nodal complexity relates to components that are contained in a box. By contrast, network complexity relates to network elements that may be widely distributed, thus stifling control. The limited adjacency of a small-capacity node necessitates multiple hops for port pairs, hence requiring complex routing protocols. The use of multiple hops also increases cost and degrades performance as nodal delays and data losses accumulate. The use of multiple-hop routes from one port to another also complicates the route selection process. Consequently, network reliability is degraded due to the difficulty of determining alternate routes in response to route failure.

In a large-scale network, the number of alternative ways of interconnecting the edge nodes is enormous. To explore some of the alternatives, it is helpful to consider edge nodes of equal size, allocating a number, Q, of ports to each of V edge nodes, such that $Q \times V = P$.

The Q ports of an edge node form an intra-nodal network, the complexity of which increases with the number of ports Q. The intra-nodal complexity is, however, contained in a box where the communication among its components is virtually instantaneous and control is, therefore, simplified. Furthermore, the nodal complexity has no operational implications and does not extend beyond the manufacturing phase. The number Q should, therefore, be limited only by optimal-access requirements and design limitations. High-capacity nodes of substantially reduced complexity can be constructed using a rotator-based architecture, which enables the construction of an edge node of 100 Tb/s capacity, with $Q=10000$ and a port capacity of 10 Gb/s (10 Gb/s input, 10 Gb/s output). A rotator-based switch is described in U.S. Pat. Nos. 5,168,492 and 5,745,486 issued on Dec. 1, 1992 and on Apr. 28, 1998 to Beshai et al.

Composite Star Network

To form a fully connected network, a moderate number, M, of edge nodes can be interconnected by a core node to form a basic star network, which has coverage limitation. For wide coverage, a composite star network interconnects the M edge nodes by a number of core nodes to form paths of adaptive capacity from each edge node to each other edge node. The number M is determined by the number of ports per core node. A path from a source node to a sink node consists of a channel from the source node to a core node and a channel from the core node to the sink node. The number M can be of the order of 1000, if the core node is an electronic space switch, or (currently) a relatively smaller number if the core node is an optical space switch.

The above composite star-like structure, which enables direct connection from a source node to a sink node, is limited by the port capacity of the core nodes; the number of edge nodes that can be supported by a composite star network is limited by the capacity of each of the bufferless core nodes. To realize higher capacity, a multi-dimensional structure can be used. The composite-star network is described in detail in Applicant U.S. patent application Ser. No. 09/286,431 titled "Self-Configuring Distributed Switch", filed on Apr. 6, 1999, the specification of which is incorporated herein by reference.

Edge-Controlled Network

An edge-controlled network of an arbitrary structure in which paths of adaptive capacity are established from each source node to each sink node enhances scalability and performance while simplifying network control. An autonomous admission control mechanism, which relies neither on users' specifications of required capacity nor on users' declaration of traffic descriptors is described in U.S. Pat. No. 6,356,546, titled "Universal transfer method and network with distributed switch", issued to Beshai on Mar. 12, 2002. A Universal Internet Protocol (UIP), which can work independently, or in conjunction with the autonomous admission-control mechanism, governs the communications among network nodes, which must be adapted to implement the UIP.

Agile Core

A core node controller selects paths through an associated core node and reconfigures the paths in response to dynamic changes in data traffic loads. Connection release and connection setup policies can be devised to increase occupancy variance among the space switches in each core node to reduce input/output mismatch and, hence, further facilitate reconfiguration. The reconfiguration functions of the edge nodes and the core nodes are coordinated to keep reconfiguration guard time at a minimum. The structure and control method permits the construction of a high capacity, load-adaptive, self-configuring switch that can be distributed geographically over a large area.

With adaptive circuit switching in the composite star network, a small proportion of the traffic can be routed through an intermediate edge node. In addition, a time-locking mechanism, to be described below, that enables coordination of the edge nodes and core nodes is required.

Applicant's U.S. patent application Ser. No. 09/671,140 filed on Sep. 28, 2000 and titled "Multi-grained Network" describes a network which includes edge nodes interconnected by core nodes having distinctly different granularities. The edge nodes switch multi-rate data traffic. The core may include core nodes that switch fixed-size data blocks, core nodes that switch channels or bands of channels, and core nodes that switch entire links. To simplify the control functions, the core nodes operate independently from each other. The network is fully meshed and the paths have adaptive capacities. The network capacity is then determined by the core node of least size. For example, if a core node has a dimension of 32×32, then a maximum of 32 edge nodes can be supported.

A network structure that maintains the simplicity and versatility of the multi-grained network while permitting expansion to much higher capacities is needed.

SUMMARY OF THE INVENTION

The present invention relates to the configuration of a network comprising universal edge nodes interconnected by optical core nodes where the connectivity is gradually increased as network usage increases. In particular, the present invention is directed to a network that starts with static optical connectors, such as Arrayed Waveguide Grating (AWG) wavelength routers, and graduates to optical switches operated in a channel-switching mode, then to fast optical switches operated in a time-division-multiplexing mode.

The network is structured to exploit current and evolving capabilities of electronic processing and photonic switching while observing known technological limitations such as the latency and scalability of optical switches. As the optical-switching technology develops, fast-switching optical core nodes may be deployed. This, however, need not result in replacement of initially deployed AWG wavelength routers, because the data-traffic level is likely to grow as advanced optical-switching devices become available and the already installed static base would be well utilized.

The disclosure describes an architecture of a basic network that comprises a plurality of edge nodes interconnected by numerous optical core nodes, allowing dense geographic coverage and a reduced optical-fiber length. The core nodes are typically of moderate capacities. In the basic network, edge nodes are divided into groups and the network is configured according to multiple levels of connectivity. The interconnection pattern, at any level, attempts to maximize the proportion of direct connections. A first-order connectivity provides intra-group connectivity. A second-order connectivity provides a connection from each edge node in a first-order edge-node group to an edge node in each other first-order edge-node group. Likewise, extension to higher-order connectivity can be carried out. An auxiliary connectivity further provides other channels from some edge nodes in an edge-node group to edge nodes in other edge-node groups. Optionally, the auxiliary connectivity can be extended until all node-pairs are directly connected, thus creating a full mush. Each connectivity order implies the existence of lower connectivity orders. Thus, $j^{th}$ order connectivity, $j>1$, implies the existence of first-order to $(j-1)^{th}$ order connectivity.

The kernel structure of a backbone network is of first-order connectivity and includes at least two edge-node groups. Node-pair connectivity is effected directly or through optical core nodes of different types. An optical core node may be a static connector implemented as an Arrayed Waveguide Grating (AWG) wavelength router, a wavelength-channel switch, a wavelength-band switch, a time-shared wavelength-channel switch, or a time-shared wavelength-band switch. With intelligent Universal Edge Nodes, the use of AWG wavelength routers as edge-node connectors is a solution that results in a structural simplicity while offering good performance.

In accordance with one aspect of the present invention, there is provided a network comprising a plurality of edge nodes interconnected by a backbone core and an auxiliary core, the backbone core comprising a first set of wavelength-division-multiplexed links and a first plurality of optical connectors, the auxiliary core comprising a second set of wavelength-division-multiplexed links and a second plurality of optical connectors wherein said backbone core provides, for each edge node, at least one backbone path having a bounded number of links to each other edge node, and the auxiliary core provides, for at least one edge node, at least one auxiliary path to at least another edge node. The network further includes a controller associated with each of the edge nodes, the controller comprising a time-locking module, a propagation-delay-measurement module, a route-selection module, and a connection-scheduling module.

In accordance with another aspect of the present invention, there is provided a backbone network comprising edge nodes arranged in a recursive structure of J order node groups, J being an integer greater than zero and each edge node constituting a zero-order group, wherein node groups of order $(j-1)$, $0<j \leq J$, are interconnected by $m_j \times m_j$ connectors to form a node group of order j so that each node has j non-overlapping paths each traversing $(j-1)$ intermediate nodes and $$\left(\sum_{k=1}^{j} m_k - 2 \times j\right)$$

non-overlapping paths each traversing j intermediate nodes to each other non-adjacent node in any other $(j-1)^{th}$-order group.

In accordance with a further aspect, there is provided a method of measuring differential one-way propagation delays along each route in a route set having at least two candidate routes from a first node to a second node; for each of the candidate routes the method comprises steps of sending a timing message at the first node along each of the candidate routes and recording time information and a queueing delay at each subsequent node along the route. The second node then computes differential propagation delays for the entire route set and communicates a result back to the first node.

In accordance with a further aspect of the invention, there is provided a method of operation for an edge node adapted to interface with core connectors, each connector having an input side and an output side, the core connectors including static connectors having a fixed input side to output side connectivity and adaptive connectors that modify input side to output side connectivity according to traffic-load variation, the edge node operable to perform steps comprising time-locking to said adaptive connectors and computing differential one-way propagation delays along candidate routes traversing said core connectors towards a second edge node; the method including the further steps of the edge node determining an estimate of an extreme value of the rate of data directed to the second edge node and selecting a number of said candidate routes according to said estimate to form a route set.

The disclosure therefore provides a Universal Network of wide-coverage and high-capacity having the capability to grow to a capacity of several Petabits per second ($10^{15}$ bits per second). The universal network comprises a plurality of Universal Edge Nodes interconnected by optical core nodes, so that a route set for any edge-node-pair includes routes each of which having a bounded number of hops. A core node can be a passive connector, an optical channel switch, or an optical time-shared channel switch. The network may include numerous core nodes of moderate sizes, each having a dimension of the order of 32×32, for example.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION OF THE INVENTION

Figure 1:
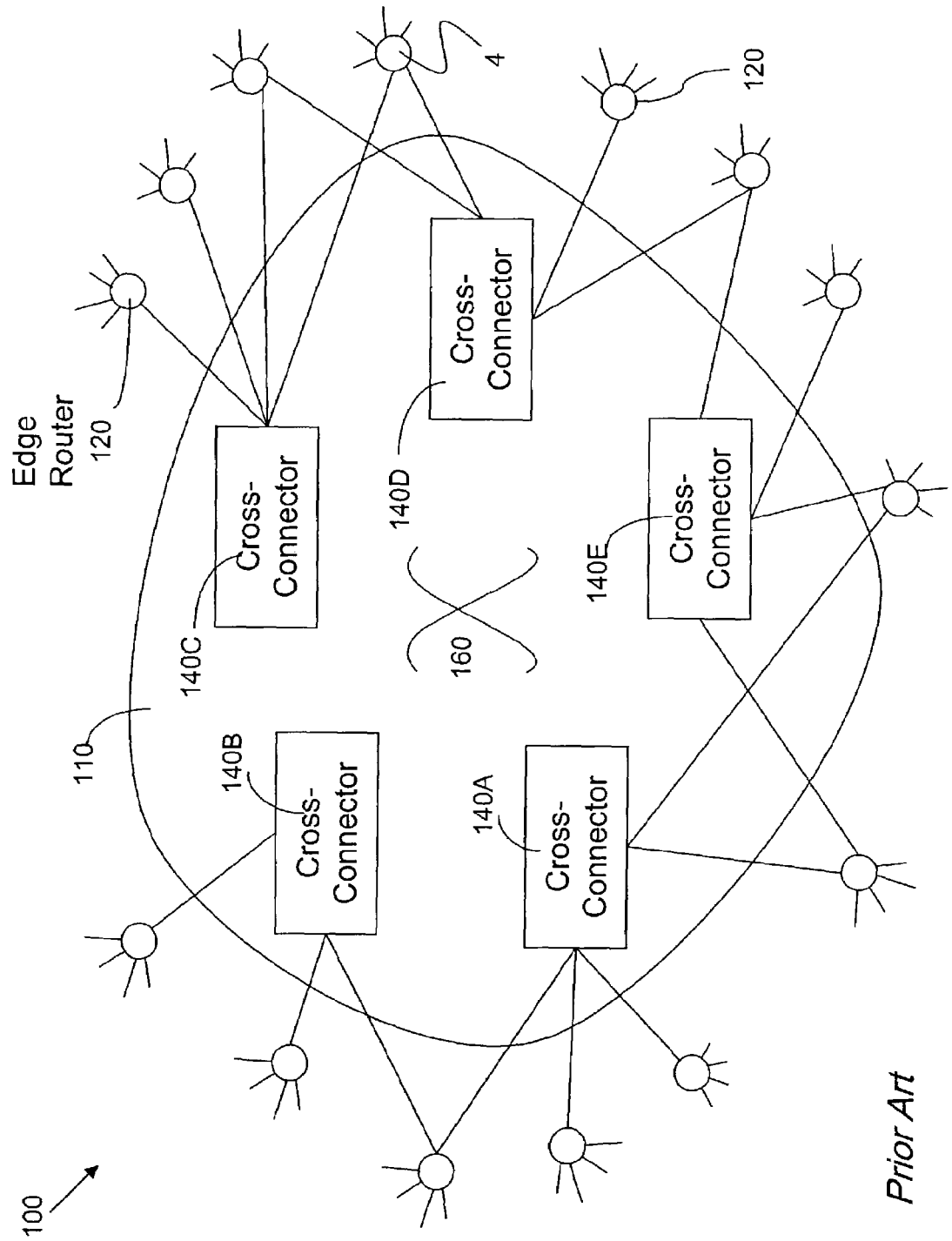
FIG. 1 illustrates a prior art data network having a plurality of edge routers interconnected by cross connectors.

A scalable, versatile, and reliable network must have a simple structure. Simplicity is made possible by technological advances that enable the construction of high-capacity electronic nodes of fine granularity as well as devices for dense wavelength multiplexing and demultiplexing. The structural simplicity leads to control simplicity which, in turn, facilitates the construction of a network of wide geographical coverage that does not require complex routing protocols. Network simplicity results in clear demarcation of the network itself and the user environment, the former would be hardware-dominated and the latter software-dominated.

The network may have a large number, possibly several thousands, of edge nodes, with each edge node comprising a source node, that receives signals from traffic sources, and a sink node, that delivers signals to traffic sinks. As mentioned earlier, a source node and the sink node of an edge node may share memory and control. Where a distinction between the source-node part and the sink-node part of an edge node is not necessary, either may be referenced simply as an edge node.

Terminology

For convenience, definitions of terms used in this disclosure are listed below:

Network ports: A network has access ports and inner ports. The access ports, also called outer ports, are connected to traffic sources and traffic sinks, and the inner ports are connected to each other. The access ports comprise input ports and output ports. Similarly, the inner ports comprise input ports and output ports. The ports are typically grouped into sets, each of which comprising an edge node or a core node. A core node is also called a connector. An edge node includes access ports and inner ports. The access input ports of an edge node are hereinafter called 'ingress ports' and the access output ports are called 'egress ports'. Ingress ports receive traffic from traffic sources and egress ports transmit traffic to traffic sinks. Ingress ports may communicate directly, through intra-node switching, with egress ports of the same edge node. Access ports of different edge nodes communicate with each other through inner ports; directly or through core nodes (connectors) to be defined below.

Source node: A source node aggregates the data traffic from several traffic sources and transmits the aggregate data traffic to another node for switching towards specified destinations.

Sink node: A sink node receives data traffic destined to several traffic sinks and switches the traffic to respective traffic sinks.

Edge node: As described above, an edge node includes access ports and inner ports. An edge node combines a source node and a sink nod and it is a common practice to have the constituent source node and sink node of an edge node share a common data memory and a common controller, hereinafter called "edge controller". Sharing a common memory enables direct internal switching from the traffic sources to the traffic sinks of an edge node. It also enables the use of an edge node for tandem switching of traffic originating from and destined to other edge nodes. The network structure and controls, according to the present invention, attempt to eliminate, or significantly reduce, the need for such tandem switching. An edge node supports traffic sources and traffic sinks where traffic sources are connected to ingress ports of the edge node and traffic sinks are connected to egress ports. Where a distinction between a source node and a sink node of the same edge node is not necessary, either may be referenced as an edge node.

Outer ports: The outer ports of an edge node comprise ingress ports that receive signals from traffic sources and egress ports that transmit signals to traffic sinks.

Inner ports: The inner ports of an edge node comprise inbound ports that receive signals from external nodes and outbound ports that transmit signals to external nodes.

Connector: A connector (core node) has inlet ports and outlet ports. The inlet ports receive signals from edge nodes (source nodes) through outbound links originating from the edge nodes and the outlet ports transmit signals to edge nodes (sink nodes) on inbound links of the edge nodes.

Static Connector: A static connector interconnects its input channels to its output channels according to a static pattern, or according to a pattern that is modified at a slow rate, for example every minute or so.

Dynamic or agile connector: A connector that can change its connectivity pattern quickly, in less than a microsecond for example, can be used as a dynamic, i.e., agile, connector. An agile connector requires a fast switching fabric and a fast-scheduling controller.

Nodal Dimension: The dimension of an edge node or a core node (a connector) is defined by the number of its input ports and output ports. The dimension is conventionally expressed in the form m×n, where m is the number of input ports and n is the number of output ports. The ports may have different capacities.

Inlet and outlet ports: A connector has inlet ports that receive signals from external nodes and outlet ports that transmit signals to external nodes.

Access and inner capacity: The access capacity (also called outer capacity) of a network is the total capacity of the access ports of a network and the inner capacity is the total capacity of the inner ports of a network. The access capacity is the capacity available to network users. In an ideal network, the ratio of inner capacity to access capacity is close to one. A high ratio is generally indicative of an inefficient network.

Inbound and outbound capacity: The inbound capacity of an edge node is the combined capacity of its inbound ports and the outbound capacity is the combined capacity of its outbound ports.

Input side: The input side of an edge node (or a core connector) collectively refers to the input ports of the edge node (or the core connector).

Output side: The output side of an edge node (or a core connector) collectively refers to the output ports of the edge node (or the core connector).

Adjacent nodes: A first node is said to be adjacent to a second node if there is a channel connection from the second node to the first node. The channel connection may be direct or through an optical connector.

Adjacency: The adjacency of a reference node is defined as the number of adjacent nodes to the reference node.

Network connectivity: The set of links interconnecting the edge nodes, either directly or through core nodes, define network connectivity.

Connectivity density: The proportion of edge-node pairs that are directly connected or connected through a core node. For example, there are 999,000 directional edge-node-pairs in a network of 1000 nodes. If there are 50,000 links connecting selected edge-node pairs, then the connectivity density is only about 0.05.

Connectivity matrix: A connectivity matrix indicates the capacity of a channel or a link from each edge node to each other edge node. In a network having a very large number of edge nodes, 10,000 for example, the connectivity matrix is likely to be a sparse matrix, reflecting a low connectivity density (<<1.0).

Recursive connectivity order: In accordance with an embodiment of the present invention, the edge nodes of a network may be arranged in a recursive structure where first-order groups are interconnected to form second-order groups, second-order groups are merged to form third-order groups and so on. Each edge node constitutes a zero-order group. A first-order group is formed by connecting a number of zero-order groups (i.e., a number of edge nodes) using a static or agile connector. The size of a first-order group is determined by the dimension of the connector. For example, a connector of dimension 64×64 enables the formation of a first-order group of 64 edge nodes. A second-order group is formed by connecting a number of first-order groups using a static or an agile connector. Each edge node in a first-order group has at least a single-channel path to an edge node within each other first-order group. The channel is routed through a connector and the maximum number of first-order groups that can form a second-order group is determined by the dimension of the connector used.

Using a connector of dimension $n_j \times n_j$ to form a $j^{th}$-order group from $(j-1)^{th}$-order groups so that a $j^{th}$-order group comprises at most $n_j$ groups of order $(j-1)$, the maximum number of edge nodes in the network would be $$\prod_{j=1}^{J} n_j$$

where J is the highest connectivity order.

Optical connector: An optical connector can be a static wavelength router, a space switch switching wavelength channels or wavelength channel bands, or a space-time switch operated in a time-shared mode switching time-slots of wavelength channels or wavelength channel bands.

Backbone core: A set of connectors providing the recursive connectivity as described above form the backbone core of the network. The backbone core ensures that each source edge node has a path of at most j hops, i.e., traversing (j-1) intermediate edge nodes, to each sink edge node where the source and sink edge nodes belong to the same $j^{th}$-order group. The backbone also provides a rich set of alternate paths of at most j hops, i.e., traversing j intermediate edge nodes, from each source edge node to each sink edge node where the source and sink edge nodes belong to a common $j^{th}$-order group.

Auxiliary core: An auxiliary core comprises a set of connectors providing further connectivity to increase the connectivity density of the network, thus reducing the mean number of hops per connection. In an extreme case, an auxiliary core can create a fully-meshed network where the network order is reduced to 1.

Network order: The highest-order of backbone connectivity defines the order of the network. For a specified number of edge nodes, it is desirable that the network order be as close to 1 as possible to reduce the mean number of hops per source-sink connection.

Link: A link comprises at least one communication channel. Hereinafter, the term 'link' refers to a fiber link carrying a wavelength-division-multiplexed (WDM) optical signal. The link may also be called a WDM link. A WDM link carries at least one wavelength channel.

Uplink and Downlink: A link from a source edge node to a connector is called an uplink and a link from a connector to a sink edge node is called a downlink. A channel in an uplink is called an upstream channel and a channel in a downlink is called a downstream channel.

Hop: A hop is defined as a channel connection, possibly through a core connector, between two successive edge nodes along a route. A route may comprise several hops.

Route set: A route set is defined for each directional pair of edge nodes. The route set is directional in the sense that the routes from a second edge node to a first edge node are not necessarily derived by reversing the routes from the first edge node to the second edge node. The routes in a route set are pre-calculated and updated only when new edge nodes, new connectors, or new links are installed in the network. When a node, a connector, or a link is temporarily unavailable, only routes that are affected by the unavailability are marked as temporarily unavailable and other routes in respective route sets are used.

Outer and inner time slots: In an asymmetrical edge node employing time-division multiplexing (TDM), a time-frame is divided into fine outer time slots at the ingress ports and egress ports, i.e., at outer ports. A time slot at ingress contains data received from a traffic source and a time-slot at egress contains data to be transmitted to a data sink. The time frame is divided into coarse inner time slots at inner ports, i.e., at inbound ports and outbound ports. A time-slot at an inbound port contains data received from another edge node either directly or through an optical connector. A time-slot at an outbound time slot contains data to be transmitted to another edge node either directly or through an optical connector.

Conventional Data Network

FIG. 1 illustrates a conventional prior-art network that comprises edge routers 120 interconnected to each other through paths, generally of different capacities. The inter-router path capacities are defined by a transport core comprising cross-connectors 140. The cross connectors 140 may be interconnected directly by fiber-optic links, or through optical cross-connectors 160 that exchange wavelength channels, thus creating paths of channel granularity instead of entire fiber-link granularity. The granularity of the cross connectors 140 has a significant effect on the transport efficiency of such a network as will be described with reference to FIG. 3. Using time-shared cross connectors, the data can be organized in TDM frames and the granularity of a cross connector 140 is then determined by the wavelength-channel capacity and the number of time slots per TDM frame. If the capacity of a wavelength channel is 10 Gb/s, for example, and with 192 time slots per TDM frame, then the capacity unit is 10 Gb/s divided by 192, i.e., about 50 Megabits per second (Mb/s). The rate of data received at an input port of a cross connector 140 from an edge router 120 must, therefore, be expressed in units of 50 Mb/s. An entire 50 Mb/s has to be allocated even if the data rate from an edge router to another edge router is significantly less than 50 Mb/s. In a network having a large number of edge routers, it is likely that a significant proportion of the time slots be underutilized, unless each edge router requires an integer multiple of 50 Mb/s to each other router, which is generally unlikely. The proportion of underutilized time slots can be significantly high when the traffic between two cross connectors 140 is low.

Network Efficiency

Figure 2:
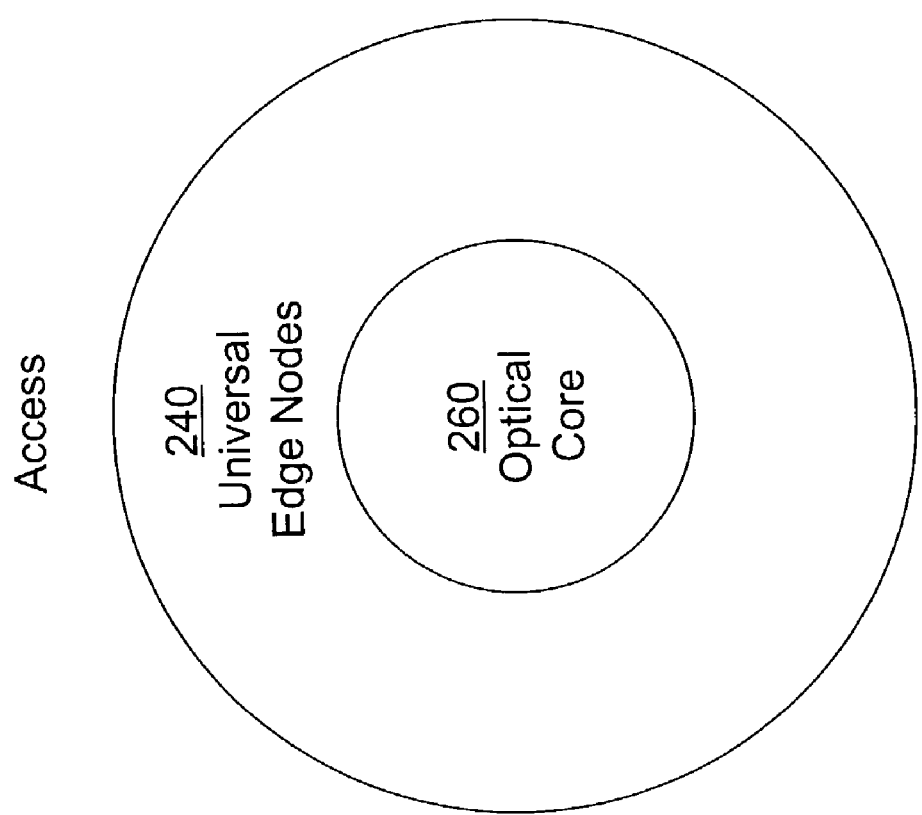
FIG. 2 is a conceptual view of a preferred network structure where the network comprises universal edge nodes interconnected by an optical core, in accordance with an embodiment of the present invention.

To realize an efficient network, the cross connectors 140 may be replaced by universal edge nodes of comparable capacities. A universal edge node has a fine granularity, enabling the establishment of connections in units of 1 Mb/s, for example. A universal node can handle both connectionless and connection-based communications and, hence, it can eliminate the need for edge routers 120, replacing them by simple traffic concentrators (not illustrated). A universal node is described in Applicant's U.S. patent application Ser. No. 10/025,982, filed in Dec. 26, 2001 and titled "Universal Edge Node". The structure of a network based on universal edge nodes is conceptually illustrated in FIG. 2. An outer access stage feeds a shell 240 of universal edge nodes which may be interconnected by a static or an adaptive optical core 260. The access devices are simple traffic concentrators, each supporting a user or a group of users.

Edge Control

An edge-controlled network of an arbitrary structure in which paths of adaptive capacity are established from each source node to each sink node enhances scalability and performance while simplifying network control. The adaptive capacity can be allocated by an automated means. An autonomous admission control mechanism, which does not rely on source specification of required capacity or declaration of traffic descriptors, is described in Applicant's U.S. patent application Ser. No. 09/132,464, filed on Aug. 11, 1998 and titled "Routing and Rate Control in a Universal Transfer Mode Network".

Multiple Hops

Figure 3:
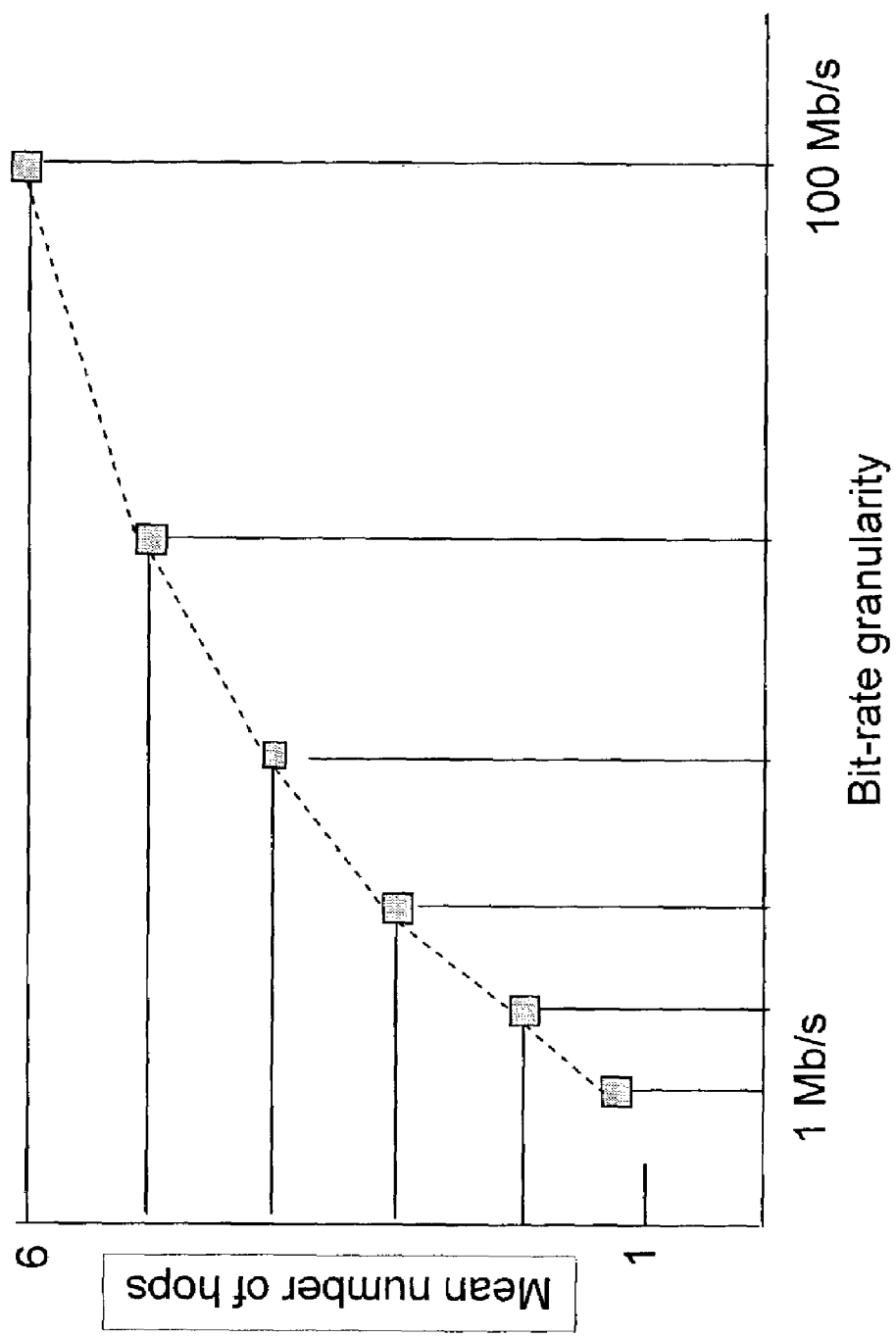
FIG. 3 illustrates a known property of dependence of the mean number of hops in a network on switching granularity.

FIG. 3 qualitatively illustrates the well-known and obvious dependence of the mean number of hops per connection on the granularity of the switching nodes. The figure illustrates a case where a bit-rate granularity of 1 Mb/s results in a mean number of hops that is slightly larger than one, while a bit-rate granularity of 100 Mb/s can result in a mean number of hops of six. Coarse granularity results in increasing the mean number of hops which, in turn, increases network complexity and cost. A break-even point is reached when a cost associated with wasted capacity due to under-utilization of a direct route equals a cost of additional capacity consumed by additional hops. The need for tandem switching at intermediate edge nodes can be dramatically reduced, or even entirely eliminated, if the optical switching nodes in the core are operated in a time-shared mode, thus providing fine granularity. The simplest time-sharing mode is TDM switching.

Figure 4:
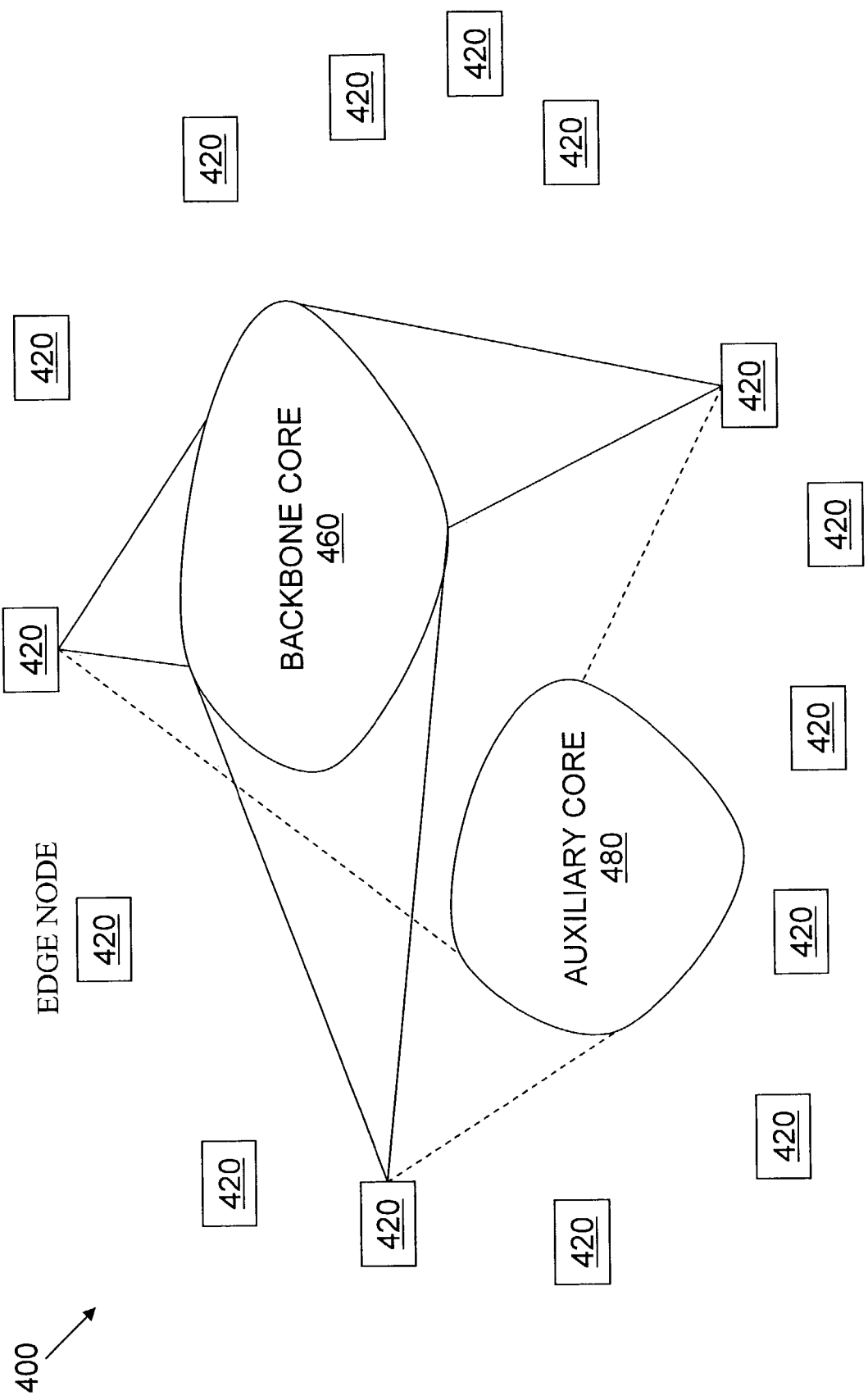
FIG. 4 illustrate a network having a plurality of edge nodes interconnected by a backbone core and an auxiliary core, in accordance with an embodiment of the present invention.

FIG. 4 illustrates a network having edge nodes interconnected by a backbone core 460 and an auxiliary core 480. The backbone core guarantees network-wide connectivity where each edge node has at least one route to each other edge node. As will be described below, the backbone core 460, according to the present invention, is organized in a manner that limits the number of hops while providing a rich set of alternate routes. The auxiliary core 480 is introduced to further reduce the number of hops for selected node pairs.

Universal Edge Node

Presently, the use of electronic edge nodes appears necessary. Despite impressive advances in optical components, the construction of switching nodes offering capabilities comparable to those of electronic nodes does not seem attainable. Until an all-optical solution can be realized, the construction of a high-capacity network has to be based on electronic edge nodes. Optical nodes are, therefore, used only in the core.

An edge node 500 (FIG. 5) includes, at its input side, several input ports and, at its output side, several output ports interconnected by an electronic switching fabric. The input ports communicate with the output ports through an electronic switching fabric 520. An input port can be adapted to receive data streams of a specific type; IP data packets for example. Each input port is preferably paired with an output port, with which it shares memory and a port controller. Each input port preferably includes a bit-rate-estimation device adapted to compute a bit-rate requirement for selected data streams. Each output port preferably includes a time locking device adapted to control data transmission time from the output port. An edge controller 540 includes (1) an edge control processor that communicates with the input and output ports, (2) a device for selecting a route for each of the data streams, (3) a fabric scheduler that includes a time-slot scheduling module 546 determines a distinct time of transfer for each of a set of data segments across the switching fabric, and (4) a bit-rate-allocation device to allocate a bit-rate of a data stream based on bit-rate requirement for the data stream computed by the bit-rate-estimation devices provided at the input ports. Details of an edge node 500 are provided in the aforementioned U.S. patent application Ser. No. 10/025,982.

Figure 5:
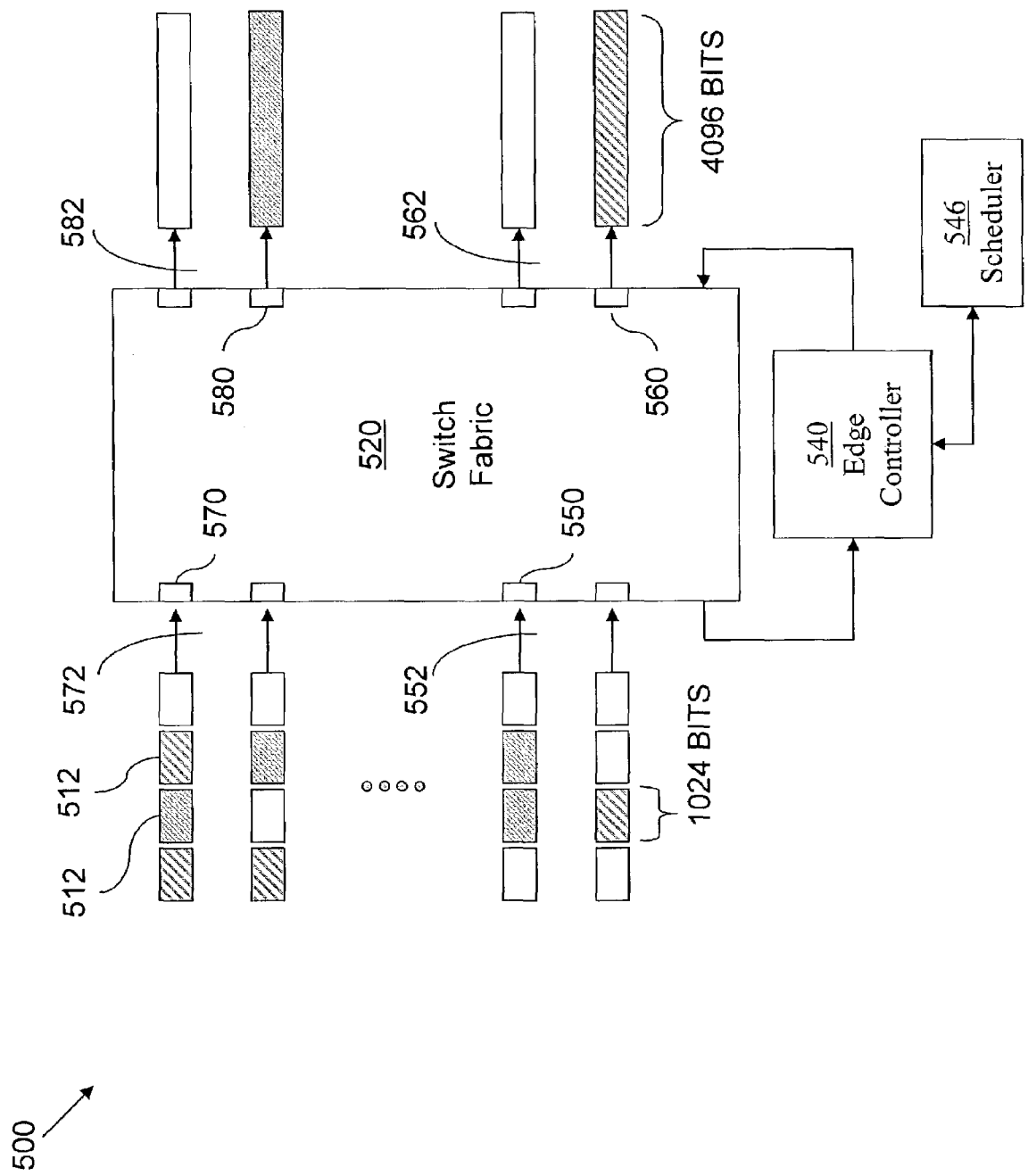
FIG. 5 illustrates an edge node having asymmetric input-output granularity in accordance with an embodiment of the present invention.
Figure 6:
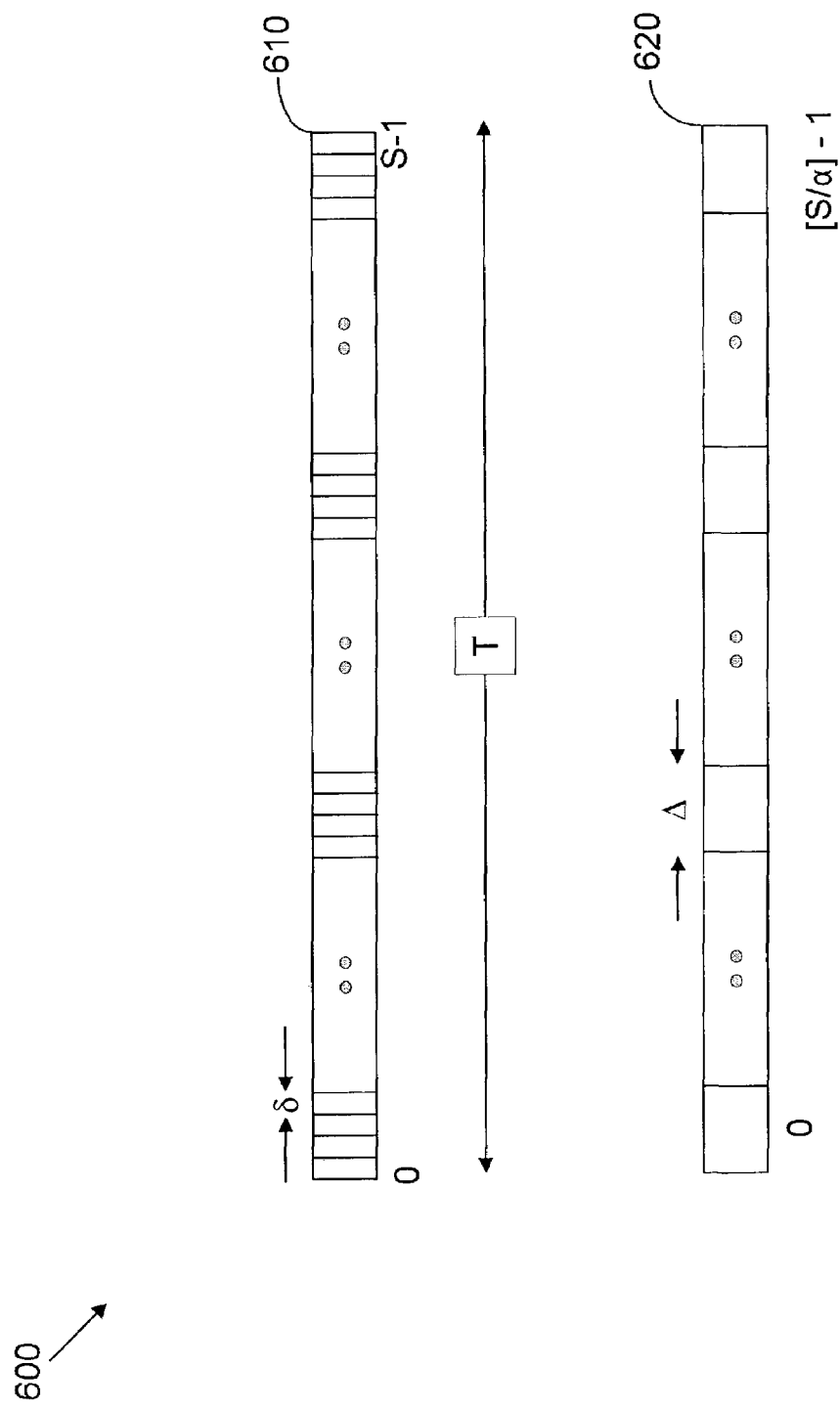
FIG. 6 illustrates the organization of a time frame at input and output of the edge node of FIG. 5.

Fine granularity is easily realizable in an electronic switching node where switching latency can be of the order of a few nanoseconds. The switching latency of an optical switch can be much higher. An electronic edge node is therefore preferably operated in an asymmetrical fashion with fine granularity at input and coarser granularity at output. FIG. 5 illustrates an electronic edge node 500 that comprises a switching fabric 520, outer ports including ingress ports 550 receiving signals from data sources and egress ports 560 transmitting signals to data sinks, and inner ports including inbound ports 570 receiving signals from other nodes or connectors and outbound ports 580 transmitting signals to other nodes or connectors. The edge node 500 also includes a scheduler 540 for scheduling the transfer of signals across the switching fabric 520. The input data is segmented into narrow data segments 512, of 128 bytes (1024 bits) each for example. Consequently, the output data is also organized into data segments. However, the size of an output segment 514 can be selected to be an integer multiple α of the size of an input data segment 512. The output data segment 514 (also called parcel) illustrated in FIG. 5 contains only four narrow data segments 512 for presentation clarity. A parcel 514 preferably includes a larger number of narrow segments. For example, using a rotator-based switch, the input and output segment sizes can be 128 bytes and 2048 bytes, respectively (α=16). At 10 Gb/s port capacity, the duration δ of an input data segment and the duration Δ of an output data segment are 100 nanoseconds and 1.6 micro-seconds, respectively. Preferably, the input and output segments are organized in time frames as illustrated in FIG. 6 which illustrates an input time frame of S input time slots and an output time frame of σ=S/α output time slots. The rotator-based switch described in U.S. Pat. No. 5,745,864, is well adapted to provide fine granularity at input and coarse granularity at output.

Packet Transfer Across the Network

Time-sharing schemes require low-latency core nodes. Due to its inherent simplicity, TDM is the preferred time-sharing method in a network employing low-latency core nodes. Several methods can be used to transfer variable-size packets over a time-slotted channel. A method of transfer of variable-size packets, associated with defined data streams, is described in Applicant's U.S. patent application Ser. No. 09/735,471, filed on Dec. 14, 2000, and titled 'Compact Segmentation of Variable-Size-Packets Streams'. At a source node of a data network, packets of a defined data stream are concatenated and transferred in equal-size segments. A rate controller governs the rate of transfer of data from a source edge node to a sink edge node across the network. The packets received from incoming channels are first segmented into plain segments of a fixed size then the plain segments, which may include a significant amount of null padding, are merged into compact segments having less null-padding. The packing process is performed under delay constraints in order to ensure that an already received packet does not experience undue delay while awaiting merger with forthcoming packets. The method further adapts the delay limit to allocated transfer rates from a source node to a sink node.

Figure 7:
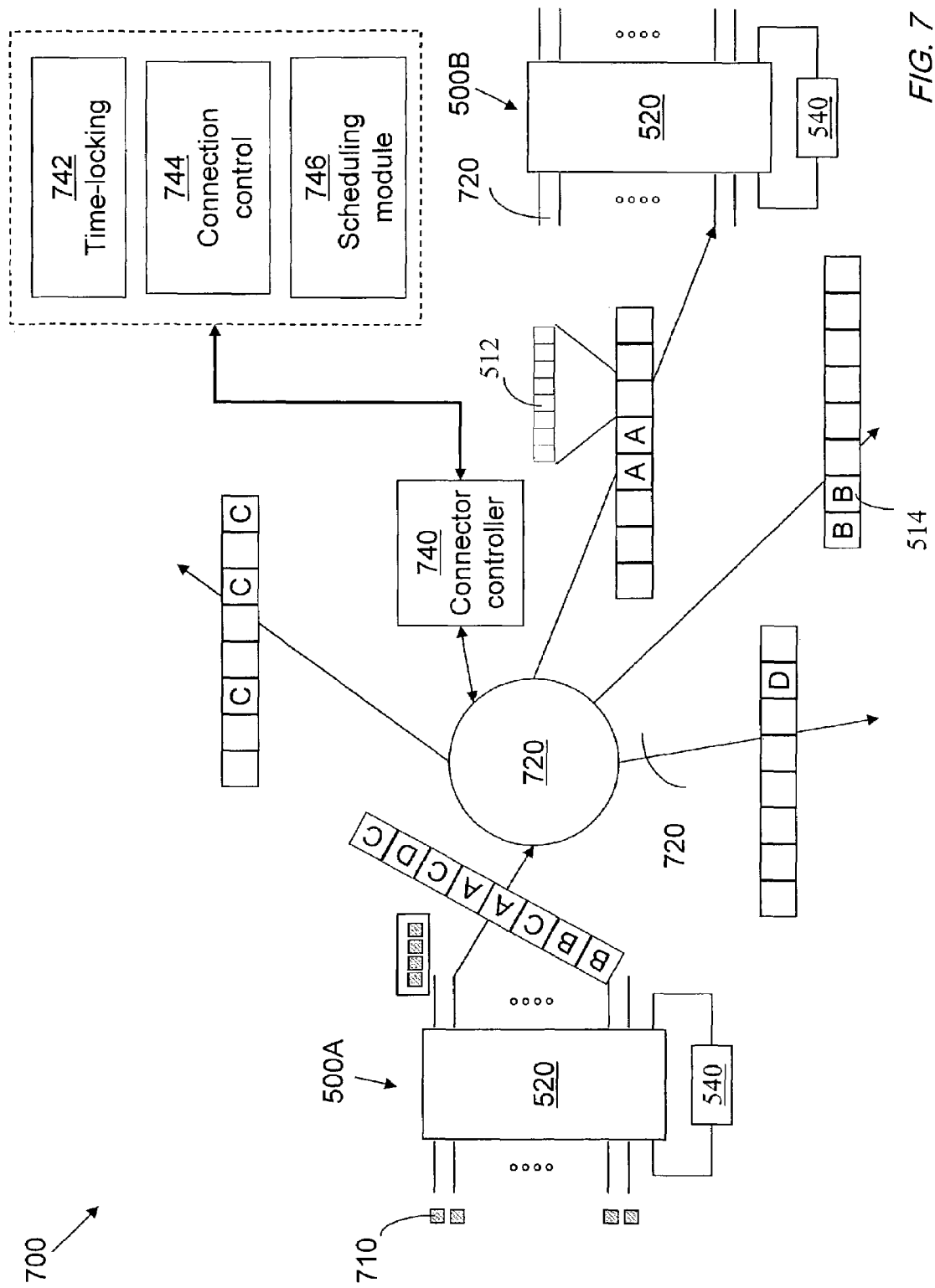
FIG. 7 illustrates an edge node connection to a core connector operated in a time-division-multiplexing mode, for use in an embodiment of the present invention.

FIG. 7 illustrates the transfer of time-slotted data from a source node 500A to a sink node 500B through a core connector 720. At each ingress port of the source node, the received data is segmented into data segments 512 of a relatively small size, where each data segment 512 is associated with a destination sink node. At the outbound port of the source node, the data segments 512 received from at least one of the ingress ports of the source node are sorted according to destination sink nodes and data segments 512 destined to each sink node are aggregated in larger parcels 514, each occupying a larger time slot, for switching at the optical core node. In the rotator-based switch described in the aforementioned U.S. Pat. No. 5,745,486, the aggregation of small input segments into larger parcels is an inherent property of the switch.

A static core connector 720 does not require connection processing capabilities. An agile core connector 720 is provided with a connector controller 740 that includes a time-locking module 742, a connection-control module 744, and a time-slot scheduling module 746. The time-locking module 742 includes a time counter (not illustrated) and is adapted to exchange time-counter readings with edge nodes. The connection control module 744 communicates with edge-node controllers 540 and determines the availability, or otherwise, of output channels leading to destination edge nodes. The time-slot scheduling module 746 schedules the input-side to output-side connectivity of the agile core node 720 and is similar to the time-slot scheduling modules 546 used at the edge controllers 540.

The granularity of the optical TDM node is likely to be courser than that of an edge node, simply because the latter is an electronic switch. The duration of the TDM frame is preferably standardized across the network. The number, S, of outer time slots per TDM frame at the edge nodes should be an integer multiple of the number, σ, of inner time slots per TDM frame at the core nodes. As described with reference to FIG. 6, the TDM frame is divided into fine outer time slots and coarse inner time slots. An outer time slot contains data received at an ingress port of an edge node from a traffic source and an inner time slot contains data transmitted from an outbound port of the edge node to an inbound port of another edge node either directly or through an optical core switch. If the value of S is $2^{14}$ (16384) and the value of σ is $2^9$ (512), then each inner time slot can hold 32 outer time slots. Each time slot holds a data segment. In the above example, an inner time slot holds a wide data segment (a parcel) 514 that is 32 times larger than a narrow data segment 512 held in an outer time slot (α=32). For example, at a channel rate of 10 Gb/s, an outer data block would be 80 bytes wide and an inner data block would be 2560 bytes wide.

Edge-Node Expansion

Each ingress port 550 in an edge node 500 receives signals from an associated ingress channel 552 carrying data from traffic sources and each egress port 560 transmits signals through an associated egress channel 562 to traffic sinks. Likewise, each inbound port 570 receives signals from other nodes through an associated inbound channel 572 and each outbound port 580 transmits signals to other nodes through an associated outbound channel 582. The number Λ of wavelength channels per edge node is divided into $k_1$ outer channels and $k_2$ inner channels. The outer (ingress and egress) channels are used for access and the inner channels (inbound and outbound) are used for interconnection of the edge nodes. Due to inevitable spatial traffic imbalance, a proportion of connections would be assigned to routes having more than one hop each. To reduce the probability of blocking (i.e., the probability of failing to find a free path from a source node to a sink node), an internal expansion is required, where the aggregate capacity of the inner channels exceeds the aggregate capacity of the outer channels. Thus, if all wavelength channels have the same capacity, the number of inner channels would exceed the number of outer channels.

Figure 8:
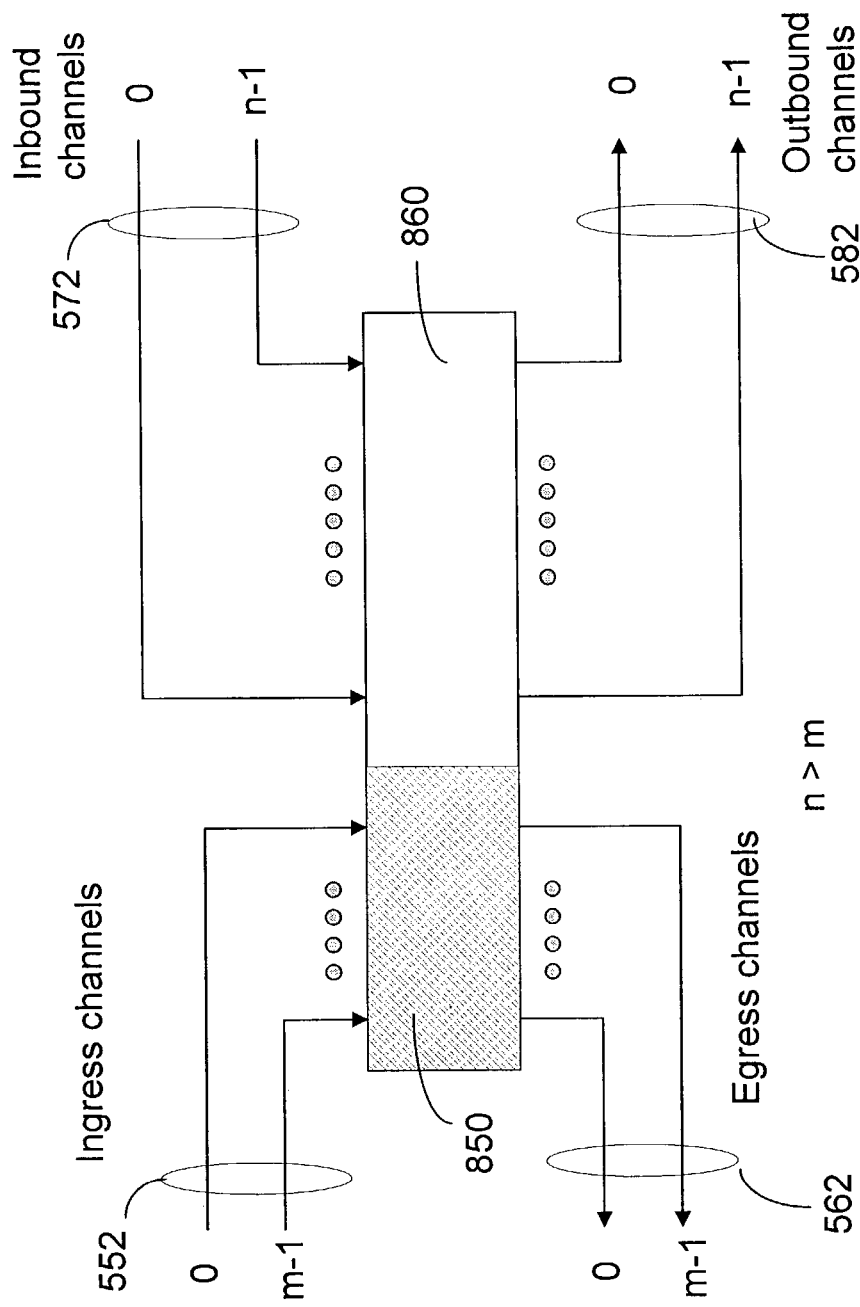
FIG. 8 illustrates a prior-art edge node having more inner ports than outer ports, all ports having the same capacity, for use in an embodiment of the present invention.

FIG. 8 illustrates the expansion needed at an edge node in order to offset the effect of multiple hops in the network core. The number of outer ports, connecting to traffic sources through ingress channels 552 and traffic sinks through egress channels 562, is less than the number of inner ports connecting to the inner ports of other edge nodes either directly or through core connectors through outbound channels 582 and inbound channels 572.

Figure 9:
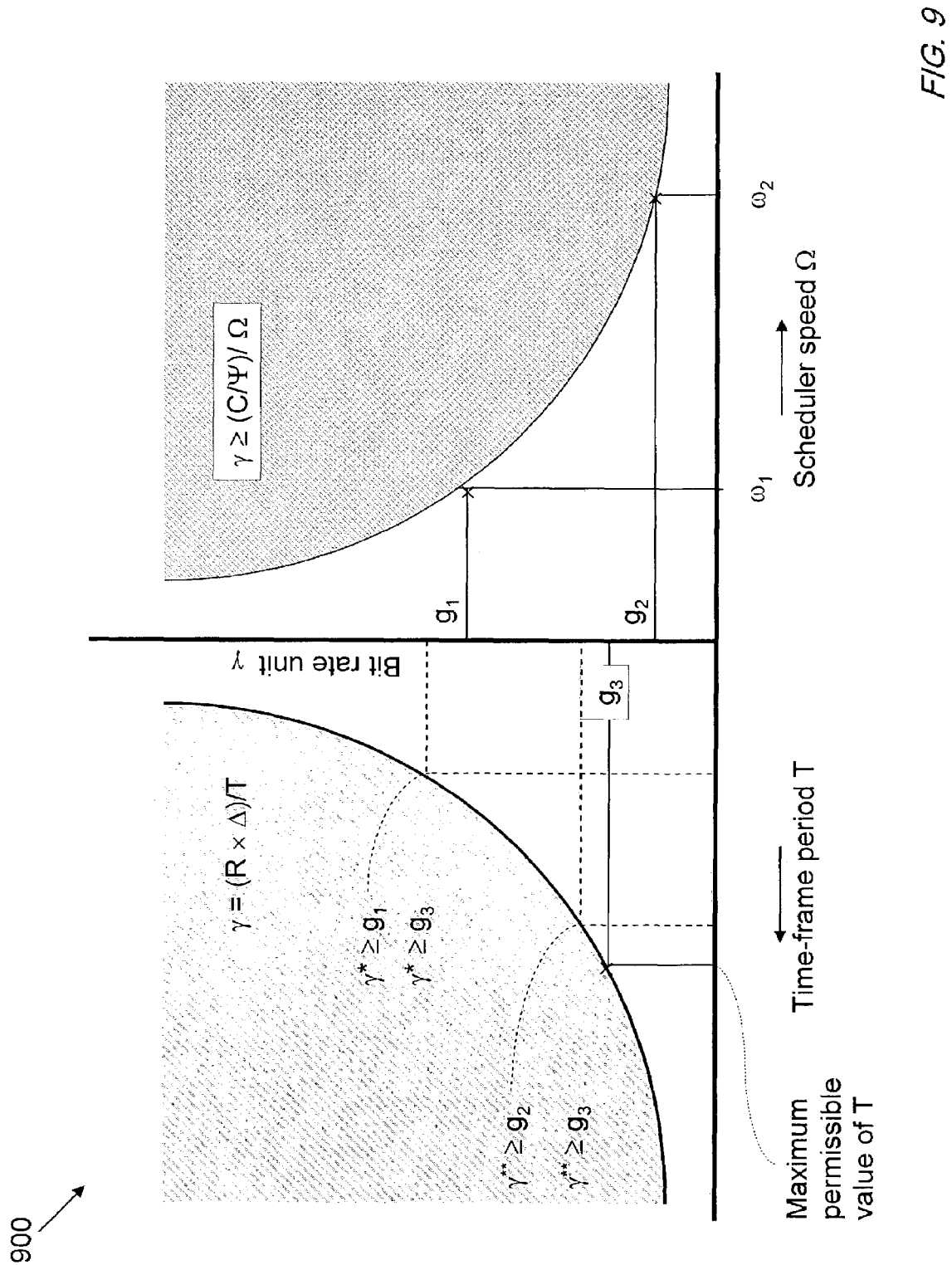
FIG. 9 illustrates a process of determining the required granularity in the edge node of FIG. 5, in accordance with an embodiment of the present invention.

By definition, a data unit is the product of the channel rate R and the duration of a time slot. In the edge node of FIG. 5, the duration Δ of an inner time slot is larger than the duration δ of an outer time slot. An outer data-rate unit γ is defined as the channel rate R divided by the number, S, of outer time slots per time frame, i.e., γ=R×δ/T, T being the period of the time frame. An inner data-rate unit is defined as Γ=R×Δ/T. The values of R, δ, and Δ are governed by technological considerations. In particular, the time-slot duration Δ has a lower bound that is decided by the switching latency of optical core switches. To realize a fine granularity, it is desirable that the period T be as large as possible. However, performance requirement may dictate that the value of T not exceed a predefined upper bound as illustrated in FIG. 9. This restriction may be imposed for service-quality reasons; a packet belonging to a data stream assigned only one time slot per time frame may have to wait for a period ranging from zero to almost an entire period T before being admitted to the switch fabric.

Fine data-rate granularity is also constrained by the speed of scheduling in both the electronic nodes and the optical connectors. As indicated in FIG. 5 and FIG. 6, a switched data unit at an output port of a node may contain α>1 input data units, 32 for example. The duration of an input data unit of one kilobit would be about 100 nanoseconds (i.e., the duration of an outer time slot is 100 nanoseconds) and an output data unit of 32 kilobits would have duration of 3.2 microseconds in a channel of speed R of 10 Gigabits per second (i.e., the duration of an inner time slot is 3.2 microseconds). A time frame at the ingress of an edge node may have 8192 outer time slots of 100 nanoseconds duration each, yielding a time-frame period of about 819.2 micro seconds, and a time-frame of the same period in an optical core switch would have 256 time slots of 3.2 microseconds each.

The speed Ω of a scheduler 540 of an edge node 500 is defined herein as the number of connection requests that can be scheduled per time unit. Connections may have widely varying capacity requirements, each specified as an integer multiple of a data-rate unit γ. The processing effort of scheduling a connection increases with the specified value of the required capacity. Assuming a linear dependence of connection processing time, which includes both the scheduling and release of each connection, on the specified capacity, and defining the speed Ω of a scheduler as the number of basic connections, each requiring γ bits per second, that can be handled per time unit, then the granularity γ is constrained by the speed Ω according to the inequality γ≧(C/Ψ)/Ω, where C is the total capacity, in bits per second for example, of the switching fabric and Ψ is the mean connection time, in seconds for example. The value of Ω can must then equal or exceed $Ω_1$, where $Ω_1$=(C×T)/(Ψ×R×δ).

FIG. 9 illustrates the criteria for selecting a switch granularity. The data rate unit γ is illustrated as a function of the scheduler speed Ω, the scheduler speed being the number of basic connections that can be scheduled per time unit. The illustrated values $g_1$ and $g_2$ of $\gamma$ correspond to a scheduler speed of $\omega_1$ and $\omega_2$ respectively, where $\omega_2 > \omega_1$. The value $g_3$ of $\gamma$, corresponds to an upper bound $\tau^*$ of the time-frame period T. With a scheduler speed $\omega_1$, the minimum value $\gamma^{}$ of $\gamma$ is the larger of $g_1$ and $g_3$. With a scheduler speed $\omega_2 > \omega_1$, the minimum value $\gamma^{}$ of $\gamma$ is the larger of $g_2$ and $g_3$. This stresses the need for high-speed schedulers in both the nodes and switching connectors to realize fine granularity. With the present state of the art, a scheduler for a node having several hundred ports can be designed to yield a very high throughput.

An edge node can be a traditional IP router or a more versatile node adapted to perform, amongst other functions, traditional router functions. The efficiency of a network is decided by the size of data unit and the data-rate unit $\gamma$. To simplify control, the input and output segments are organized in time frames as illustrated in FIG. 6 which illustrates the organization of a time frame of S input time slots and $\sigma = S/\alpha$ output time slots.

A scheduler 540 used in an edge node can also be adapted for use in an agile optical connector. The scheduling-speeds of an edge-node scheduler and an optical-switch scheduler (not illustrated) determine the data rate granularity, i.e., the data-rate lower bound. The required scheduling speed, $\Omega_2$, of an optical switching connector implemented as a TDM optical switch is $\Omega_2 = (C^* \times T)/(\Psi \times R \times \Delta)$, where $C^*$ is the capacity, in bits per second, of the TDM optical switch. The ratio $\alpha = \Delta/\delta \geq 1$, and the values of $\Omega_1$ and $\Omega_2$ determine the outer data-rate unit $\gamma$ and the inner data-rate unit $\Gamma$.

To summarize, the required speed, $\Omega_1$, of a time-slot scheduling module 546 of an edge node 500, expressed as the number of basic connection requests that can be scheduled per time unit is determined according to the inequality:

$$\Omega_1 \geq (C \times T)/(\Psi \times R \times \delta),$$

and the required speed, $\Omega_2$, of a time-slot scheduling module 746 of an agile core node (agile connector) is determined from:

$$\Omega_2 \geq (C^* \times T)/(\Psi \times R \times \Delta),$$

where

C is the total access capacity for an edge node, and $C^*$ is the total inlet capacity for an agile connector, both expressed in bits per second, T is the duration of the time frame in seconds, $\Psi$ is the mean connection time in seconds, R is a channel capacity expressed in bits per second, $\delta$ is the duration in seconds of an outer time slot for an edge node, and $\Delta$ is the duration in seconds of an inner time slot for an edge node, which is the same as the time slot at an inlet port of a connector receiving an outbound wavelength channel 582 from an edge node 500.

Network Structure

One of several structures of an efficient network comprises electronic edge nodes interconnected by a backbone core and an auxiliary core as illustrated in FIG. 4. The backbone core provides, for each directed edge-node pair, at least one path having a bounded number of hops. The auxiliary core comprises another set of WDM links and optical connectors. A connector can be a static connector, such as an arrayed waveguide grating (AWG) static wavelength router, an optical-channel switch, or a time-shared optical switch operating in a time-division-multiplexed (TDM) mode or burst-switching mode. Initially, however, available static AWG-based connectors may be used to expedite the deployment of such a network. This may necessitate that a proportion of traffic use more than one hop to destination where a connection traverses at least one intermediate node. In order to diversify the connectivity, the connectivity of the auxiliary core should not overlap that of the backbone core. This restriction is desirable but not necessary.

Recursive Optical-Backbone Connectivity

An $m_1 \times m_1$ connector interconnects $m_1$ multi-channel input links to $m_1$ multi-channel output links so that a channel in any input link can be routed to any output link. The connector may then interconnect $m_1$ edge nodes in a mesh structure where each node has a direct path and $(m_1 - 2)$ two-hop paths to each other of the $m_1$ edge nodes. The $m_1$ nodes are said to form a first-order group. The connector may be static, such as an AWG wavelength router, or dynamic with time-varying connectivity.

The value of $m_1$ is limited by both technological factors and network design considerations. In order to increase the number of edge nodes, several first-order groups may be interconnected by $m_2 \times m_2$ connectors to form a second-order group so that each node in a first-order group would have two non-overlapping paths of two hops each and $(m_1 + m_2 - 4)$ non-overlapping paths of three hops each, to each non-adjacent node in any other first-order group. Likewise, several second-order groups may be interconnected by $m_3 \times m_3$ connectors to form a third-order group, and so on. In general, several $(j-1)^{th}$ order groups, $0 < j \geq J$, can be interconnected by $m_j \times m_j$ connectors to form $j^{th}$ order group in which each node has j non-overlapping paths each having j hops, i.e., traversing $(j-1)$ intermediate edge nodes, and $$\left( \sum_{k=1}^{j} m_k - 2 \times j \right)$$

non-overlapping paths each comprising (J+1) hops, i.e., traversing j intermediate edge nodes, to each other non-adjacent node in any other $(j-1)^{th}$ order group.

The number of nodes in a $J^{th}$ order group is $$E = \prod_{j=1}^{J} m_j$$

and the number of $m_k \times m_k$ connectors, $1 \leq k \leq J$ is $$\sum_{k=1}^{J} \left( \prod_{\substack{j=1 \\ j \neq k}}^{J} m_j \right).$$

If $m_1 = m_2 = \ldots = m^*$, the total number of $m^* \times m^*$ connectors is $J \times m^{*J-1}$.

For example, with J=2, and $m_1 = m_2 = 32$, the maximum number of nodes is 1024 and the number of 32×32 backbone connectors is 64. With J=3, $m_1 = m_2 = m_3 = 32$, the maximum number of nodes is 32768 and the number of 32×32 backbone connectors is 3072. Comparing the structures with J=2 and J=3, the number of nodes increases by a factor of 32 while the number of connectors increases by a factor of 48. It is also noted that the required inner-outer expansion at the nodes increases with increasing the order J of the recursive backbone structure. In general, even With the use of auxiliary connectivity, the connectivity density decreases as the backbone connectivity order increases.

Figure 10:
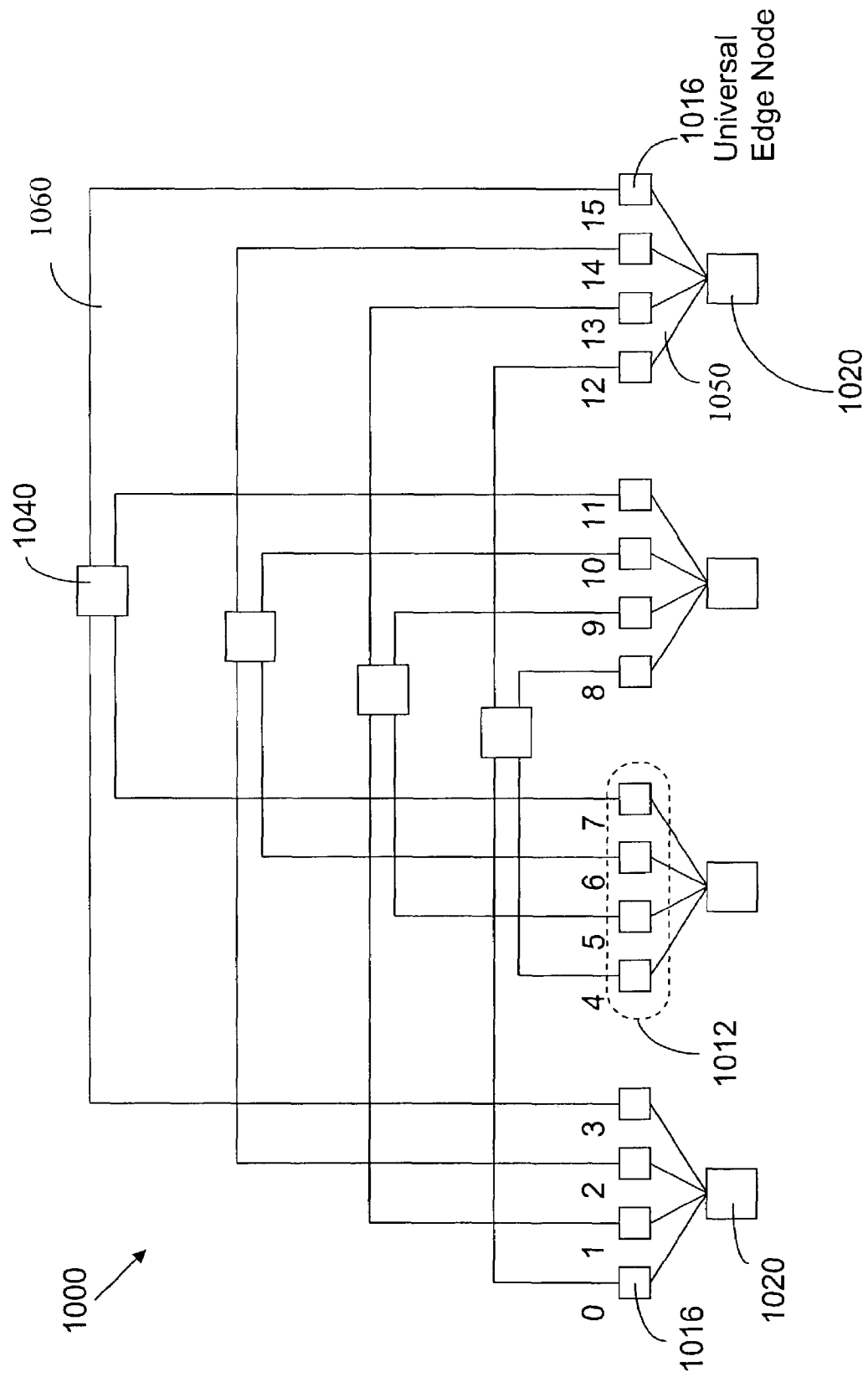
FIG. 10 illustrates a second-order network having a plurality of edge nodes interconnected by a second-order backbone core, according to an embodiment of the present invention.

FIG. 10 illustrates a second-order backbone core that comprises AWG wavelength routers 1020 interconnecting a first-order group 1012 of edge nodes 1016, AWG routers 1040 interconnecting edge nodes 1016 belonging to different first-order groups 1012, and wavelength-division-multiplexed (WDM) links 1050, and 1060. An auxiliary core, illustrated separately in FIG. 11 does not overlap the backbone and comprises a set of optical connectors 1140 interconnecting selected edge-nodes 1016 through WDM links 1160. In the backbone core of FIG. 10, edge node 5 has direct channels to its adjacent edge nodes 1, 4, 6, 7, 9, and 13, but can reach other nodes through two-hop paths; there are two two-hop paths {5, 1, 2} and {5, 6, 2} from node 5 to node 2 through the backbone core of FIG. 10.

Constructing the Backbone

Consider a network having a target number of nodes of $v>1$ and the dimension of an available connector for a $j^{th}$-order group is $\mu_j \times \mu_j$. The value of $\mu_j$ may differ according to the group order j. For example, first-order connectivity and second-order connectivity of a backbone core may be based on static connectors, such as wavelength routers, of dimension $32 \times 32$ each, i.e., $\mu_1 = \mu_2 = 32$, while third-order connectivity may be based on agile connectors of dimension $16 \times 16$ each. It is preferable, however, that the backbone connectivity be based on static connectors, with agile connectors used only in the auxiliary core. If $\mu_1$ is larger than or equal to $v$, then a fully-meshed first-order network can be formed. If $\mu_1$ is smaller than $v$, then a network of at least a second-order connectivity is required. If $\mu_1 < v \leq \mu_1 \times \mu_2$, then the number $n_2$ of first-order groups that form a second-order group is determined as $n_2 = \lceil v/\mu_1 \rceil$, where $\lceil r \rceil$, r being not necessarily an integer, is the smallest integer that is not less than r. If $v/\mu_1$ is not an integer, then some first order groups would have a number of edge nodes equal to $(\mu_1-1)$ and the remaining first-order groups would have $\mu_1$ edge nodes each. The number $\kappa_1$ of first-order groups having $(\mu_1-1)$ edge nodes each is determined as: $\kappa_1 = (\mu_1 \times n_2 - v)$ and the number $\kappa$ of first-order groups having $\mu_1$ edge nodes each is: $\kappa_2 = (n_2 - \kappa_1)$. For example, if $v=20$, and $\mu_1=\mu_2=5$, then $n_2=\lceil v/\mu_1 \rceil=4$, $\kappa_1=0$ and $\kappa_2=4$. Thus, the network comprises four first order groups each first-order group having five edge nodes. If $v=22$, then $n_2=\lceil v/\mu_1 \rceil=5$, $\kappa_1=3$ and $\kappa_2=2$, i.e., the network comprises three first-order groups of four edge nodes each and two first-order groups of five edge nodes each.

In a high-capacity network having a number of edge nodes $v=3500$, and using connectors of dimension $64 \times 64$, i.e., $\mu_1=\mu_2=\mu_3= \ldots =64$, the number of edge nodes per first-order group is initially selected to equal $\mu_1$. The value of $v$ is less than $\mu_1 \times \mu_2 = 4096$, hence a second-order connectivity suffices. The number $n_2$ of first-order groups per second-order group is determined as $n_2 = \lceil v/\mu_1 \rceil = \lceil 3500/64 \rceil = 55$. The number of first-order groups having $\mu_1 - 1 = 63$ edge nodes each is $\kappa_1 = (\mu_1 \times n_2 - v) = 20$ and the number of first-order groups having $\mu_1 = 64$ edge nodes is $\kappa_2 = n_2 - \kappa_1 = 35$.

In general, the required order J of connectivity for a network of $v$ edge nodes is determined from:

$$\prod_{j=1}^{J-1} \mu_j < v \leq \prod_{j=1}^{J} \mu_j.$$

If $\mu_1 = \mu$ for all orders of connectivity, then the connectivity order J is determined from $\mu^{(J-1)} < v \leq \mu^J$.

Consider a network of 3500 edge nodes ($v=3500$), with $\mu_1=\mu_2=\mu_3=\ldots=32$. The value of $v$ is higher than $\mu_1 \times \mu_2$ but lower than $\mu_1 \times \mu_2 \times \mu_3$, hence a third-order connectivity is required. The number of edge nodes per first-order group is initially selected to equal $\mu_1=32$. The number $n_2$ of first-order groups in the network is then $\lceil v/\mu_1 \rceil = \lceil 3500/32 \rceil = 110$. The number of first-order groups per second-order group is initially selected to equal $\mu_2=32$. The number $n_3$ of second-order groups in the third-order group is then determined as $\lceil \lceil v/\mu_1 \rceil / \mu_1 \rceil = \lceil 110/32 \rceil = 4$. Thus, the network includes $n_2 \times n_3 = 128$ first-order groups and the mean number of edge nodes per first-order group is now revised to be $v/(n_2 \times n_3) = 3500/(32 \times 4) = 27.34$. Thus, the maximum number $n_1$ of edge nodes per first-order group is revised to be $\bar{n}_1 = 28$. The number of first-order groups, having 27 edge nodes each, is determined as $\kappa_1 = \bar{n}_1 \times n_2 \times n_3 - v = 84$ and the number of first-order groups having 28 edge nodes each is $\kappa_2 = n_2 \times n_3 - \kappa_1 = 44$.

Figure 12:
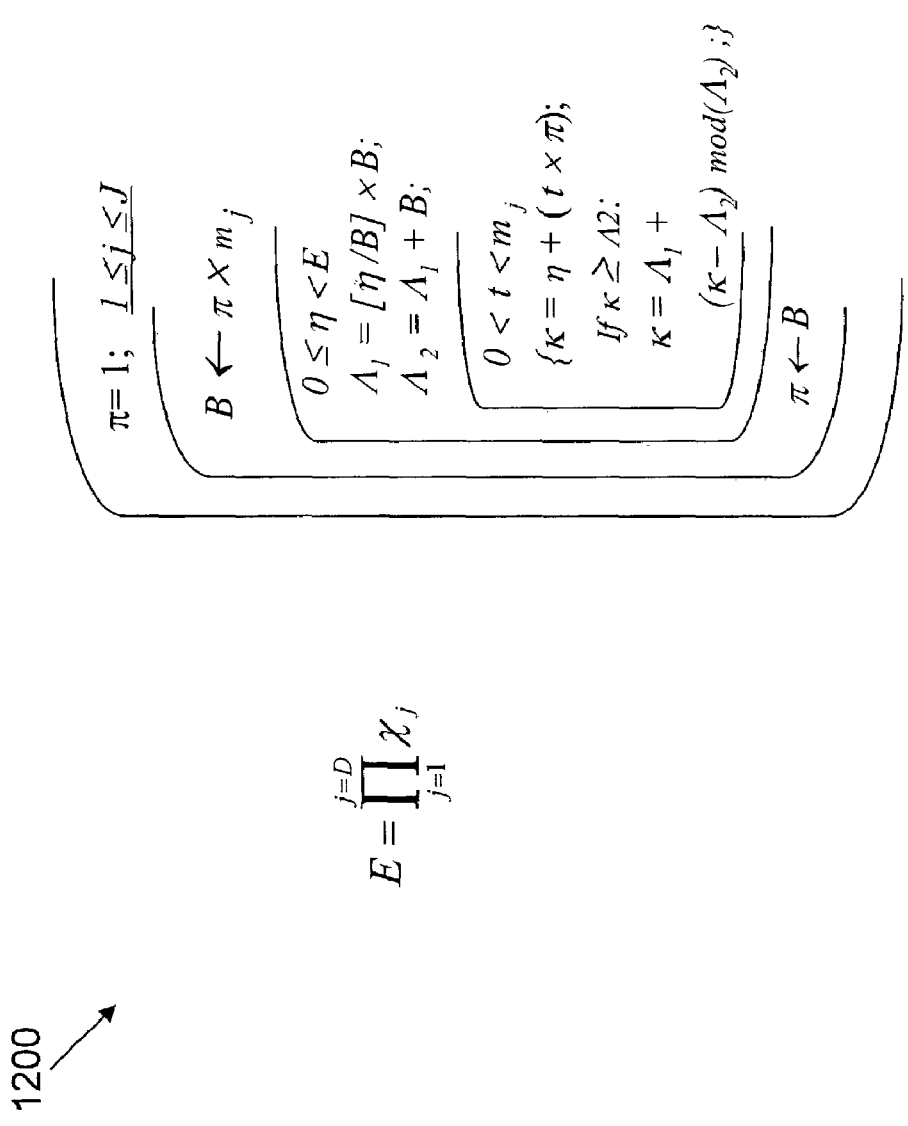
FIG. 12 is an algorithm for determining, according to a recursion, the connectivity of backbone core of an arbitrary connectivity order, in accordance with an embodiment of the present invention.

The algorithm of FIG. 12 determines the connectivity matrix according to the following steps:

A fully-configured backbone core has an equal number of edge nodes per first-order group, an equal number of first-order-groups per second-order group, and so on. An upper bound E of the number of edge nodes is determined as $$E = \prod_{j=1}^{J} n_j,$$

where $n_j$ is the maximum number of groups of $(j-1)^{th}$-order in a $j^{th}$-order group. As described earlier, a single edge node constitutes a zero-order group. The algorithm of FIG. 12 determines the connectivity for a fully-configured backbone core. If any $j^{th}$-order group has less than $n_j$ members of $(j-1)^{th}$-order groups, the connectivity determined for the missing edge nodes can be ignored. The outer-most loop in FIG. 12 determines the $j^{th}$ order connection for each of the E edge nodes. The edge nodes are numbered from 0 to (E−1). For each connectivity order j, $0 < j \leq J$, $(n_j - 1)$ connections from each edge node $\eta$ to $(n_j - 1)$ other edge nodes are determined. Each of the connections is identified as a directed connection from edge node $\eta$ to an edge node $\kappa$. For each connectivity level j, the edge nodes to which an edge node $\eta$, $0 \leq \eta < E$, connects is bounded between two values $\Lambda_1$ and $\Lambda_2$ as indicated. The notation $\lfloor r \rfloor$ reads 'the integer part of real number r'. The conventional notation $X_{mod(Y)}$ refers to the remainder of the division of an integer X by an integer Y. For example, $9_{mod(4)} = 1$.

The backbone connectivity matrix is computed as indicated in the algorithm of FIG. 12, which successively determines paths for edge-node pairs $\{\eta, \kappa\}$. For each edge node $\eta$, $0 \leq \eta < E$, E being the total number of nodes in a fully configured backbone core, a link $\{\eta, \kappa\}$ to a node $\kappa_1$ where $0 \leq \kappa < E$, is determined for each order of connectivity. In a first pass, the first-order connectivity is considered (setting j=1) and the first-order channels from each node are determined. The value of j is then increased to 2 and, in a second pass, the second-order links are determined, and so on, until j=J is processed.

Figure 13:
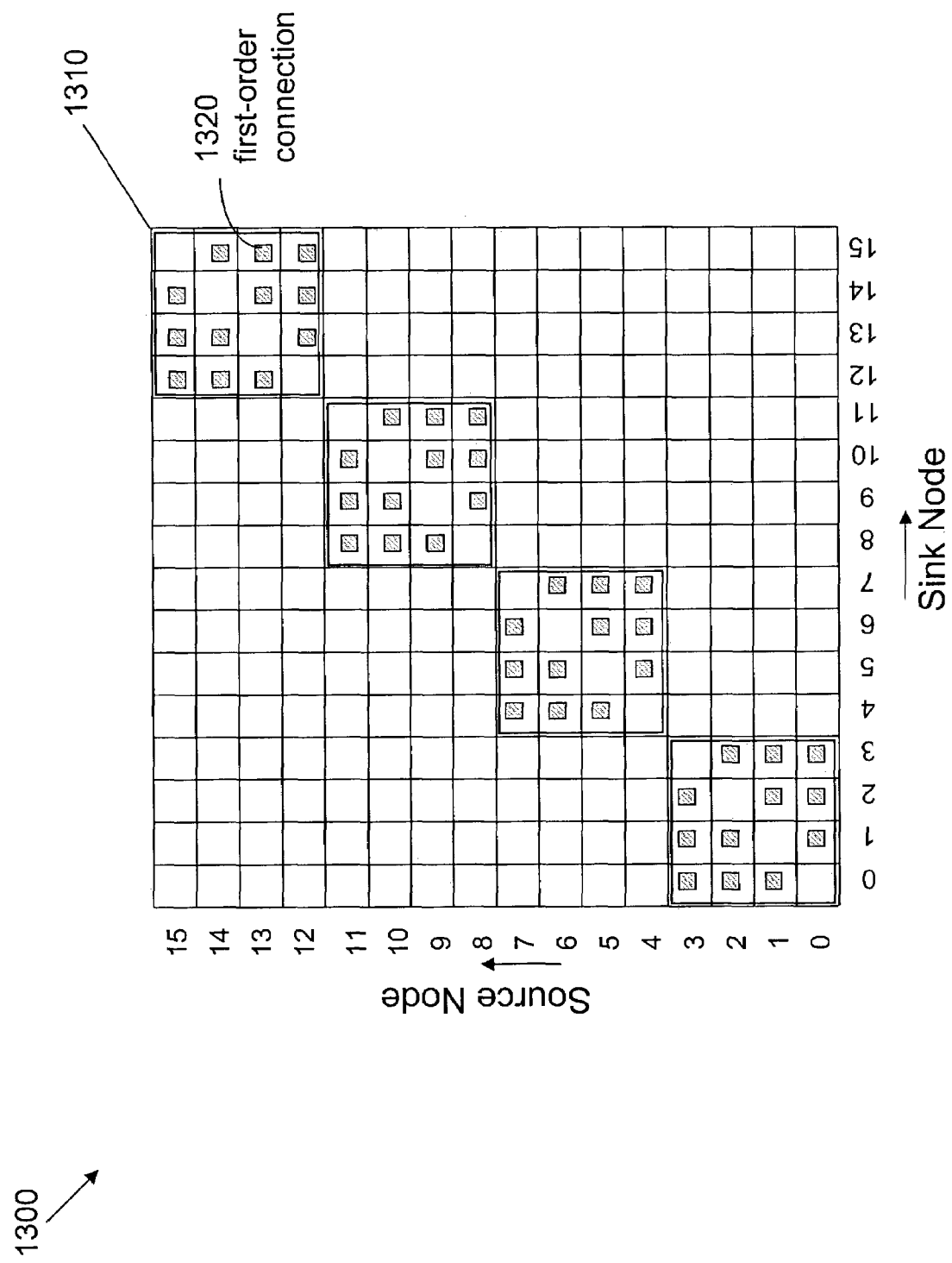
FIG. 13 illustrates a first-order backbone connectivity matrix of the second-order network of FIG. 10, for use in an embodiment of the present invention.
Figure 14:
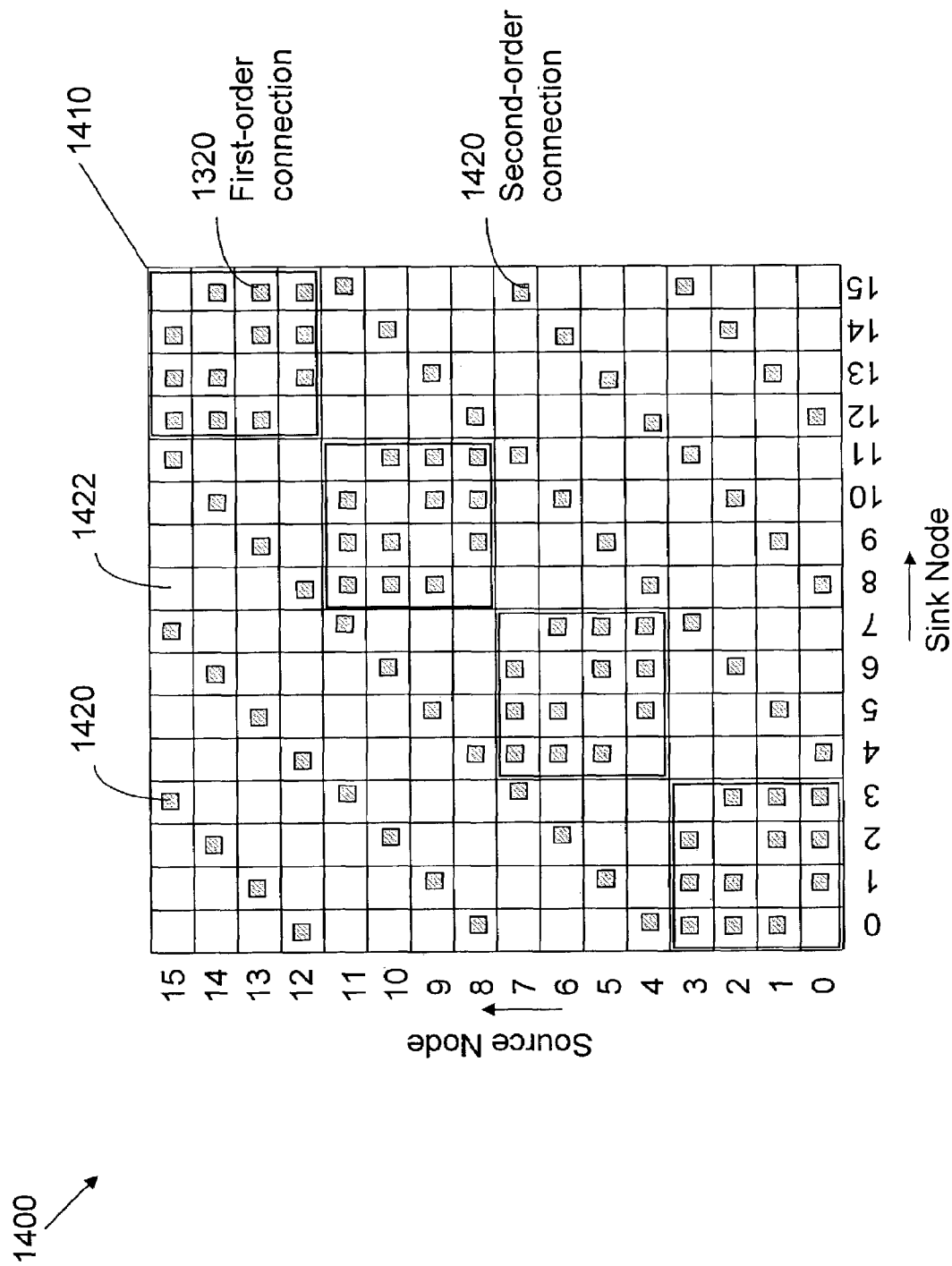
FIG. 14 illustrates a second-order backbone connectivity matrix of the second-order network of FIG. 10 for use in an embodiment of the present invention.
Figure 15:
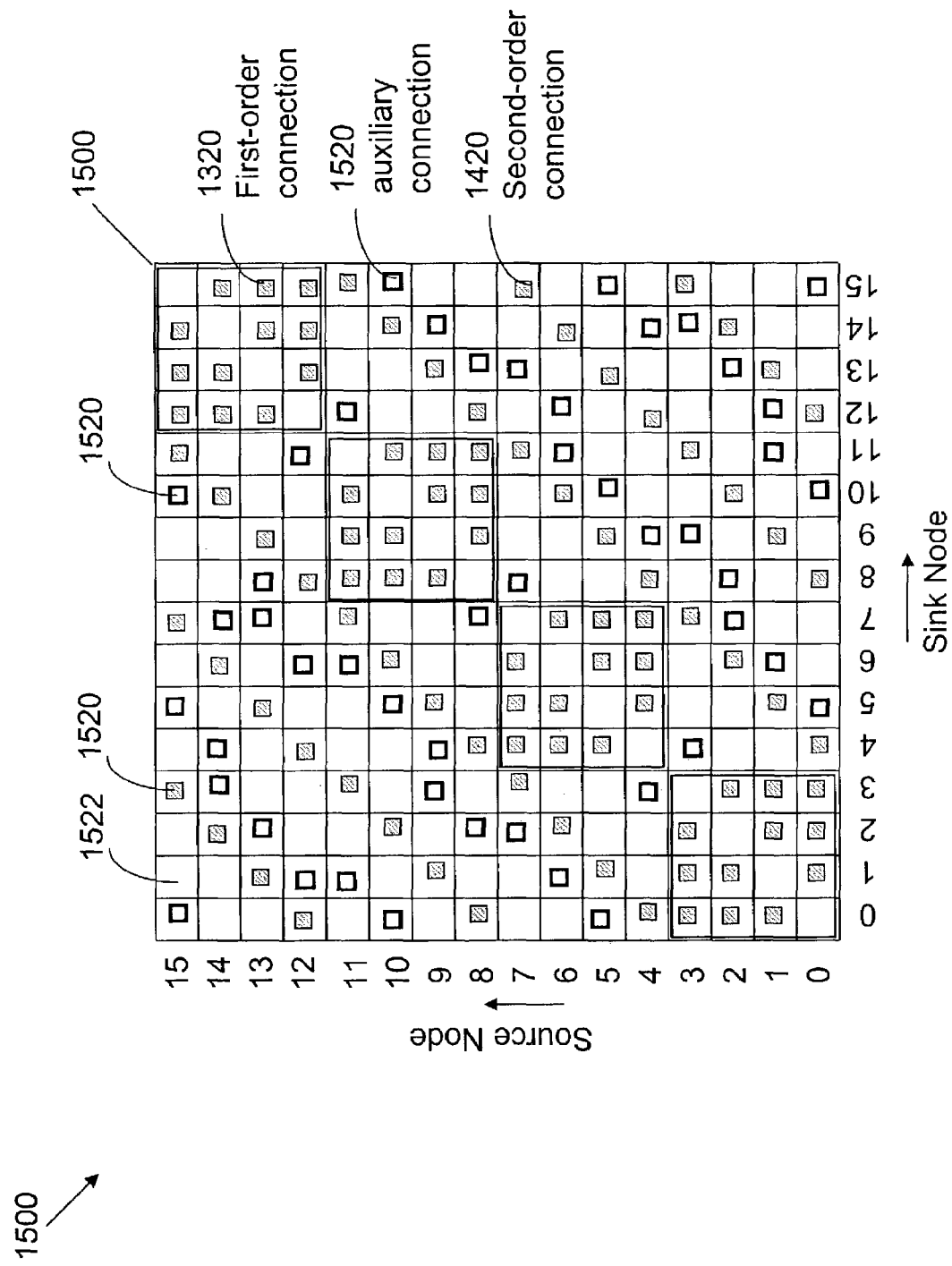
FIG. 15 illustrates the connectivity matrix of the network of FIG. 10, including the auxiliary core of FIG. 11, for use in an embodiment of the present invention.

The backbone connectivity of the network of FIG. 10 (J=2, $m_1=m_2=4$), determined according to the above algorithm, is illustrated in FIGS. 13, and 14. FIG. 13 illustrates the first-order connectivity matrix 1310 and FIG. 14 illustrates the first and second-order connectivity matrix 1410 having E rows and E columns, E being the total number of nodes. An entry 1320 or 1420 corresponding to an edge-node pair {j, k}, $0 \leq j < E$, $0 \leq k < E$, indicates the number of direct optical channels that connect source node j to sink node k. The number of channels is not explicitly indicated in any of entries 1320 or 1420. An entry 1422 corresponding to an edge-node pair {j, k} and having a null content indicates that source node j is not directly connected to sink node k. FIG. 15 illustrates an additional auxiliary connectivity corresponding to the auxiliary core of FIG. 11 which is introduced to reduce the mean number of hops. It is important to select the auxiliary connectivity pattern so that the second-order paths do not intersect the first-order paths. As illustrated in FIG. 15, entries 1520, corresponding to auxiliary paths, do not coincide with entries 1320 or 1420 which correspond to backbone paths.

Figure 16:
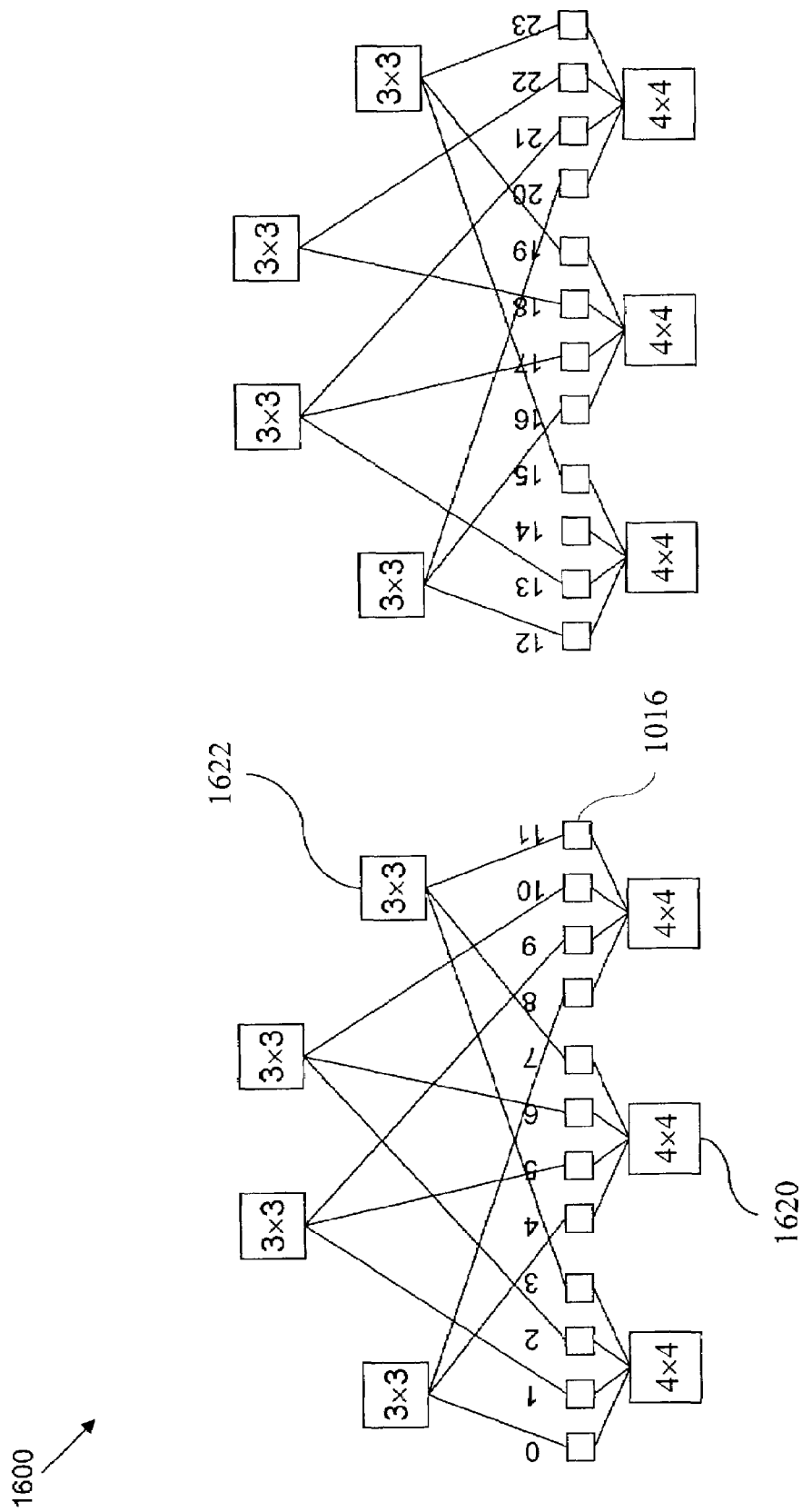
FIG. 16 illustrates a third-order network indicating the first-order connectivity and second-order connectivity, in accordance with an embodiment of the present invention.
Figure 17:
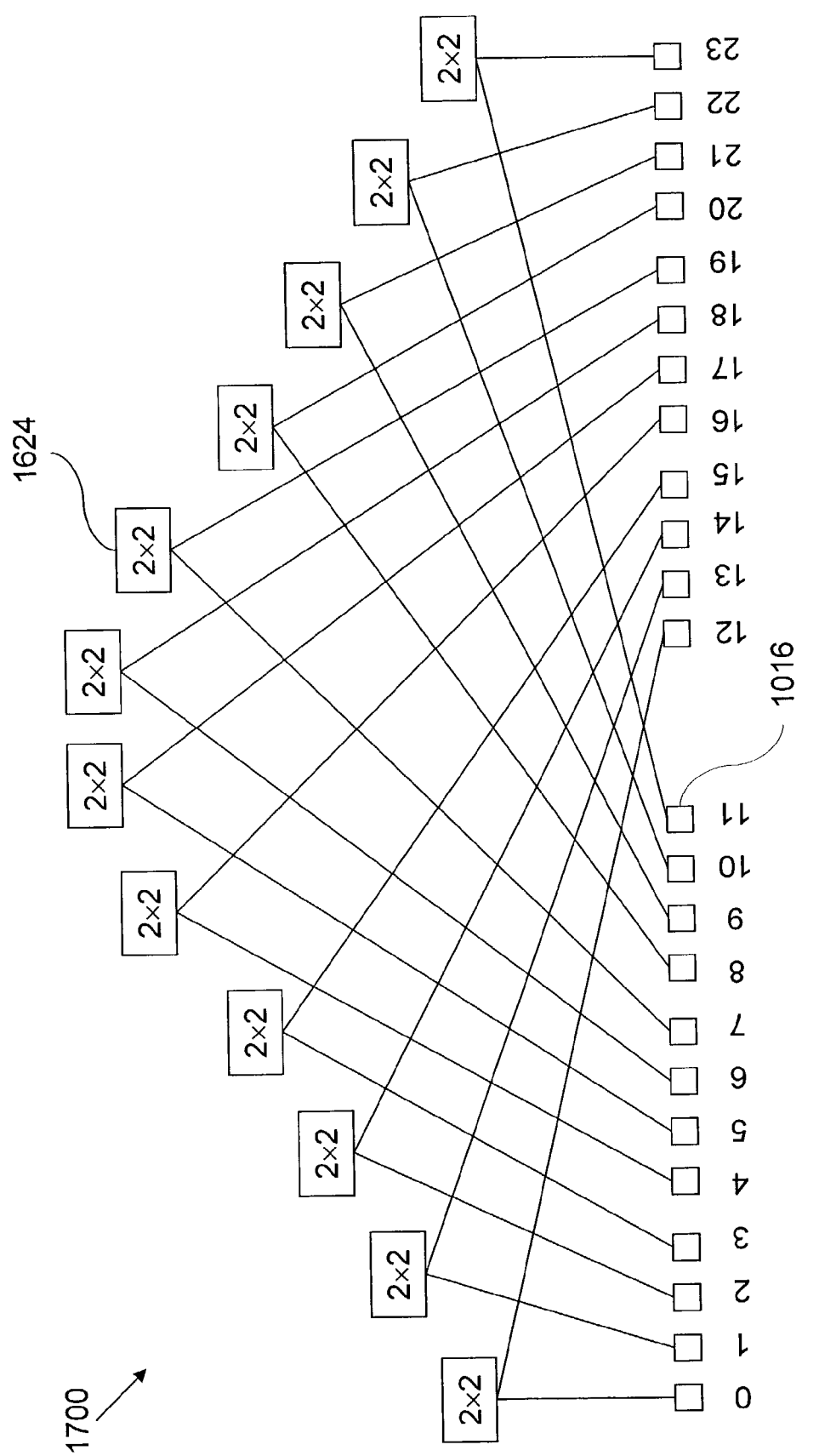
FIG. 17 illustrates the third-order connectivity in the third-order network of FIG. 16.

FIG. 16 illustrates the first-order connectivity and second-order connectivity in a third-order network having four edge nodes per first-order group, three first-order groups per second-order group, and two second-order groups for the third-order group constituting the network. FIG. 16 illustrates the two second-order groups each using a 4×4 connector per first-order group, and four 3×3 connectors to interconnect the three first-order groups constituting each of the two second-order groups. FIG. 17 illustrates the third-order connectivity where twelve 2×2 connectors connect each edge node in one of the two second-order groups to an edge node in the other second-order group.

The connectivity density, as defined earlier, is limited by the number, $k_2$, of inner channels of a node, an inner channel being a channel in a WDM link connecting to another node. A node having 256 channels, grouped into 8 WDM links of 32 channels each, can be divided into 3 outer links (access links) and 5 inner links (core links) to provide a sufficient internal expansion. In a second-order network, two of the five inner links may connect to the backbone core and the remaining three may connect to an auxiliary core. The expansion ratio, i.e., the ratio of inner to outer channels, should at least equal the mean number of hops per source-sink connection. For the same network order, the mean number of hops decreases with the increase in auxiliary-core connectivity density.

Figure 18:
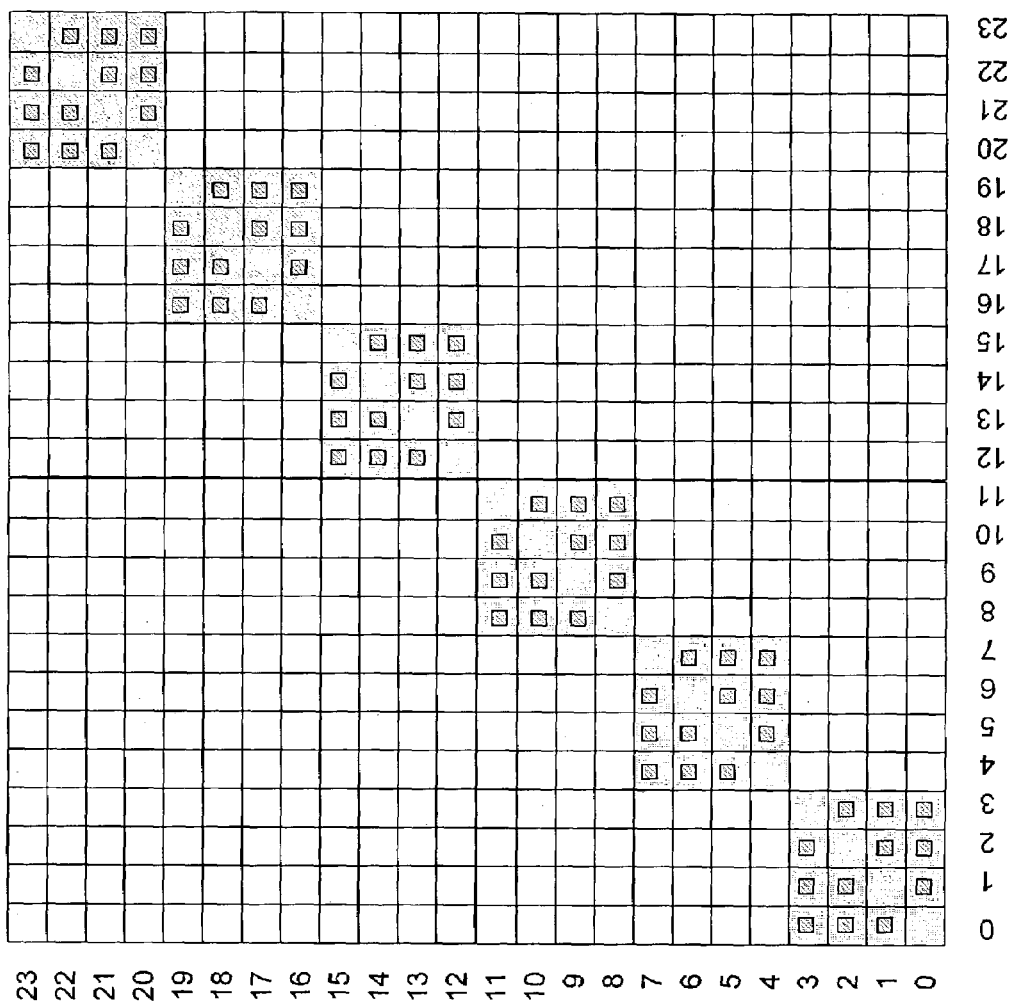
FIG. 18 illustrates a first-order backbone connectivity matrix of the third-order network of FIG. 16 and FIG. 17 for use in an embodiment of the present invention.
Figure 19:
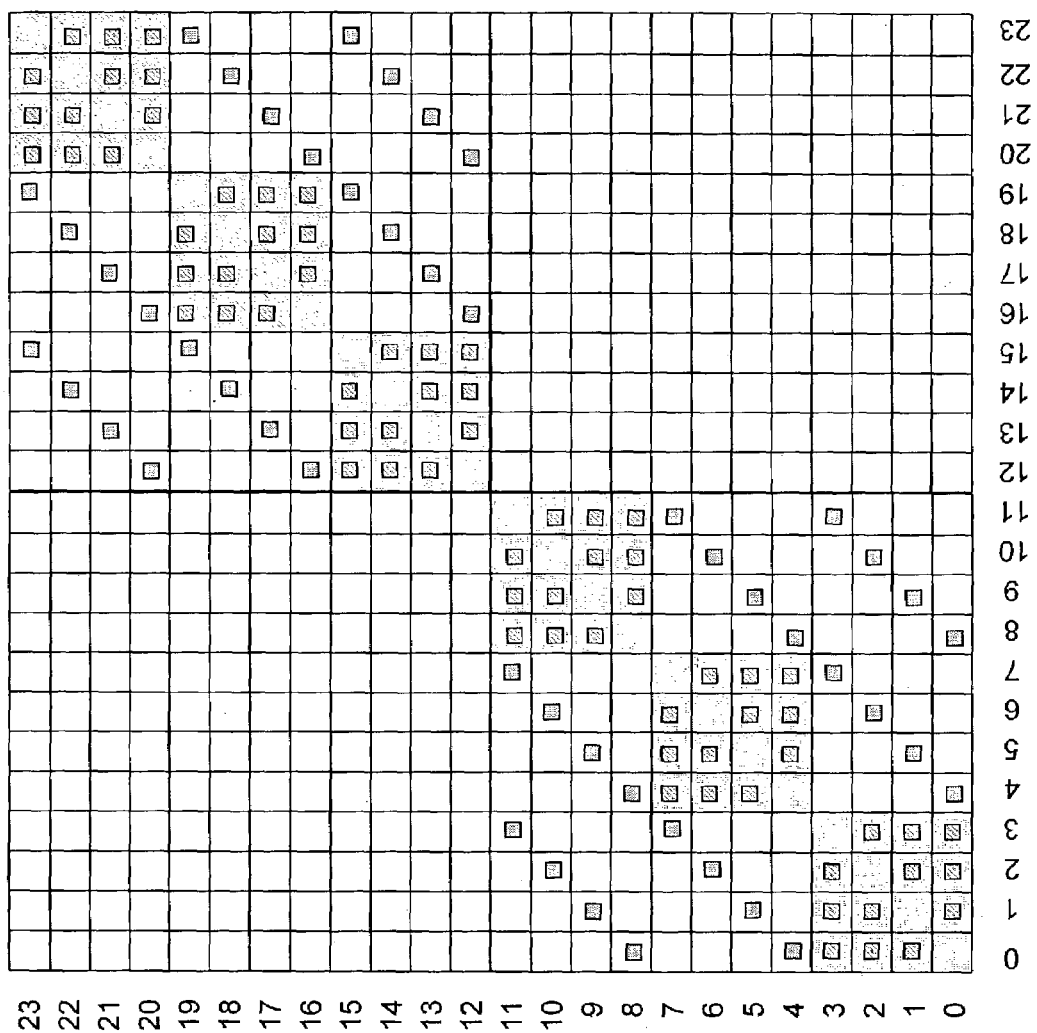
FIG. 19 illustrates a second-order backbone connectivity matrix of the third-order network of FIG. 16 and FIG. 17 for use in an embodiment of the present invention.
Figure 20:
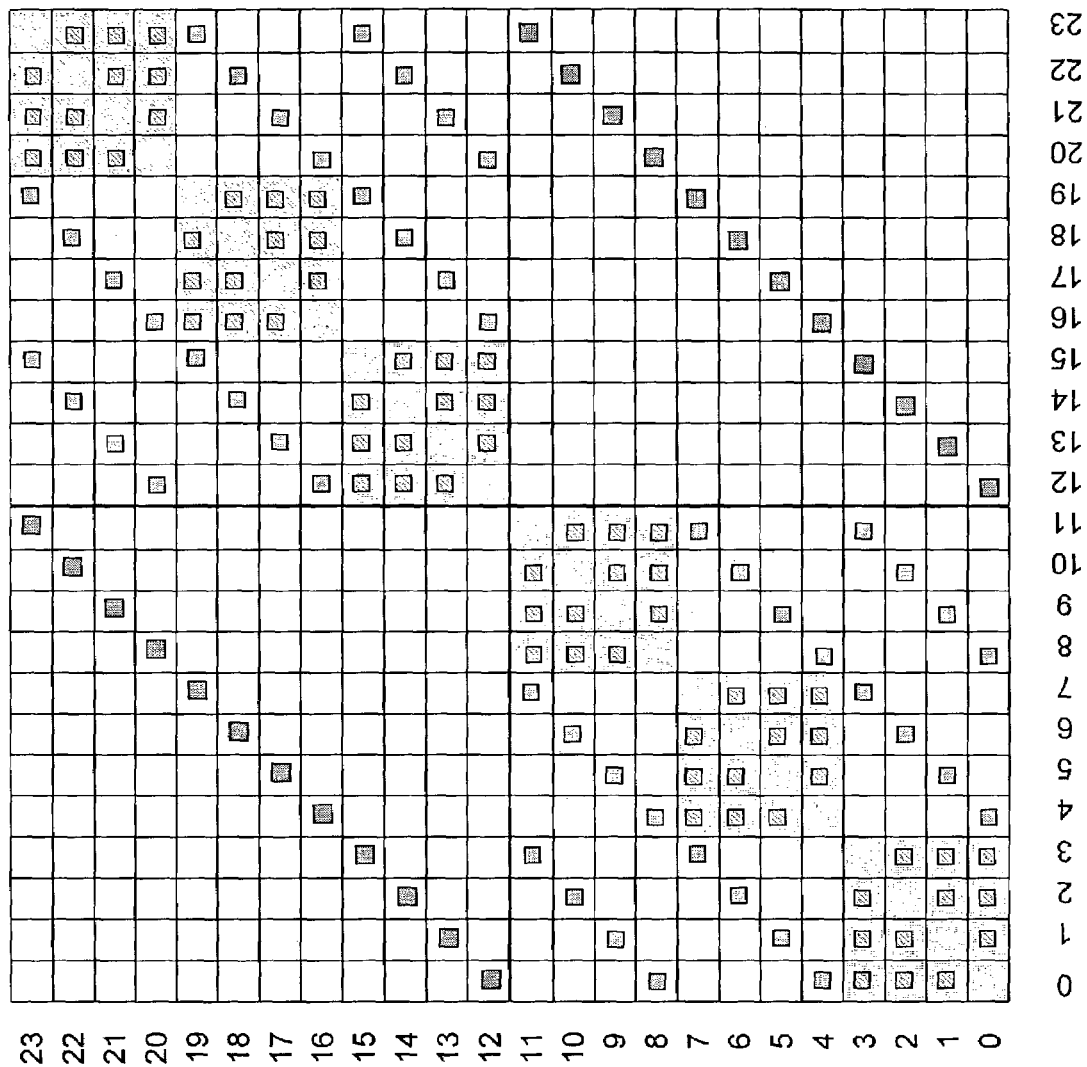
FIG. 20 illustrates a third-order backbone connectivity matrix of the third-order network of FIG. 16 and FIG. 17 for use in an embodiment of the present invention.

FIGS. 18, 19, and 20 illustrate connectivity matrices for a third-order network of 24 nodes with $m_1=4$, $m_2=3$, $m_3=2$. FIG. 18 illustrates the first-order connectivity pattern, which creates islands that are not interconnected but each of which is internally connected. FIG. 19 illustrates the second-order of connectivity, which includes the first-order connectivity, and FIG. 20 illustrates the three orders of connectivity.

In any of the illustrated connectivity matrices of FIGS. 13, 14, 15, 18, 19, and 20, an entry indicates the existence or otherwise of a path, through a connector, for a directed edge-node pair. A path comprises at least one wavelength channel. The number of channels for each path is not indicated in the illustrated connectivity matrices but is understood to be present.

Network Capacity

Figure 11:
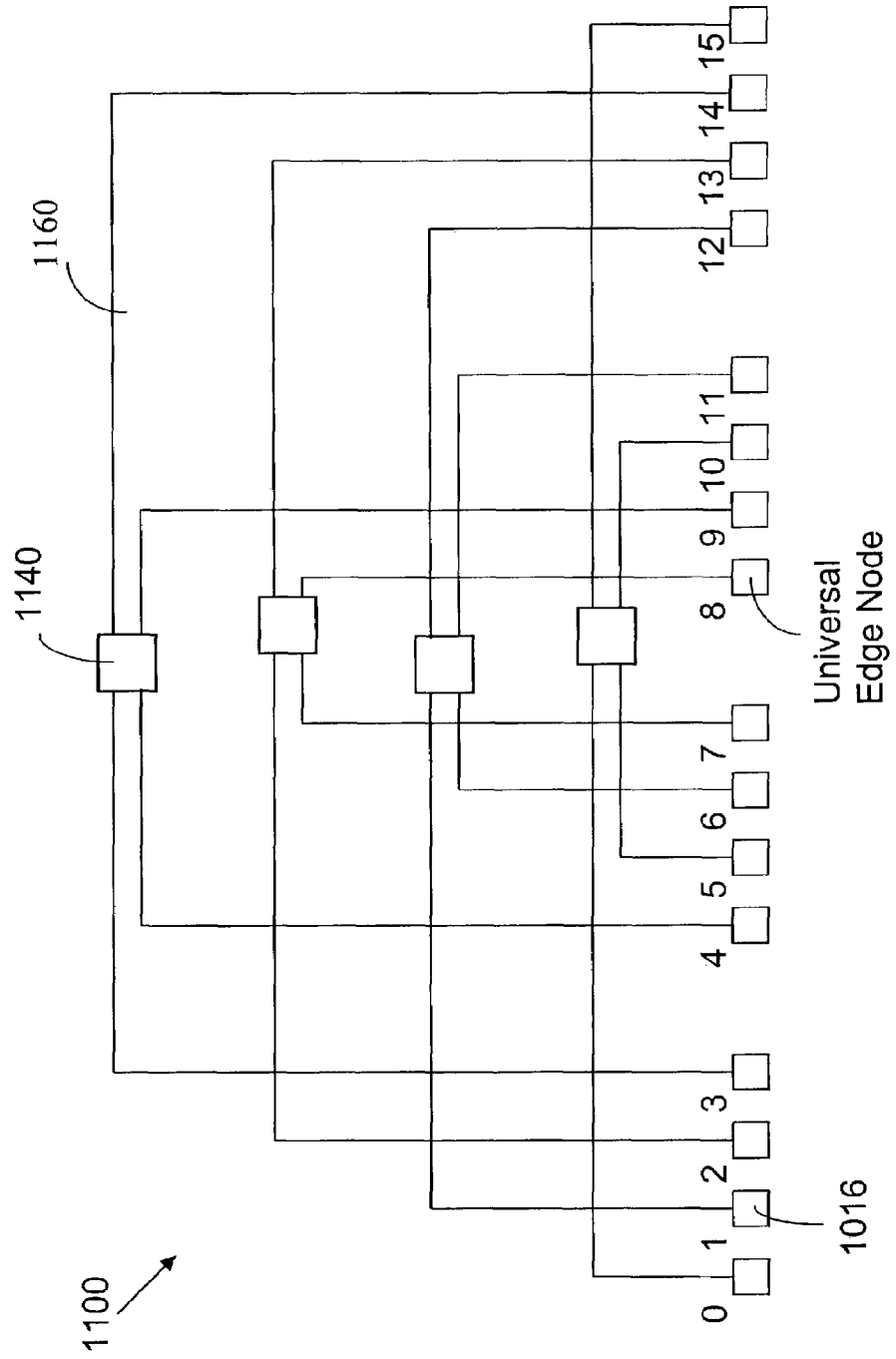
FIG. 11 illustrates an auxiliary core added to the second-order network of FIG. 10, in accordance with an embodiment of the present invention.

The capacity of the network is bounded by the limited connectivity density as well as the mean number of hops; the larger the number of hops per connection, the lower the throughput becomes. This necessitates the use of expansion at nodes where the capacity of the inner channels exceeds the aggregate capacity of the outer channels as described earlier. As the traffic-load increases, auxiliary connectivity may be added as illustrated in FIG. 11 and indicated in the connectivity matrix of FIG. 15. It is important to select the auxiliary connectivity pattern so that the auxiliary paths do not overlap the backbone paths or other auxiliary paths. With time-varying spatial traffic distribution, non-overlapping paths allocation is more likely to reduce the mean number of hops per connection.

The number, $\Lambda$, of channels of each side of an edge node is divided into $c_0$ outer channels connecting to subtending data sources and sinks, and $c_j$ channels for each $j^{th}$ connectivity order through the optical core, $0 < j \leq J$, J being the connectivity order of the entire network, so that $\Lambda = c_0 + c_1 + c_2 + \ldots + c_J$. In practice, the nodes may vary in capacity, and the number of channels per connectivity order may be edge-node specific, thus, for node $\eta$, $0 \leq \eta < E$, $c_j$ can be limited to $X(\eta, j) \leq c_j$.

Traffic originating from ingress ports of an edge node and destined to egress ports of the same edge node can be switched internally within the edge node, hence the number $c_j$ of wavelength channels that an edge node sends to an $m_j \times m_j$ connector equals $m_j - 1$.

The access capacity (outer capacity) of the network is determined as:

$$C = E \times c_0 \times R,$$

where, as defined earlier, E is the number of edge nodes, $c_0$ is the number of ingress wavelength channels connecting to traffic sources, and R is the bit rate per wavelength channel. Thus, with J=2, $c_0$=96, $c_1=c_2$=32, $E=33^2$=1089 nodes, and R=10 Gb/s, the capacity C is 1.045 Petabits per second. Selecting W to be 64, the network access capacity would be of the order of 4 petabits per second. With J=3, $c_0$=96, $c_1=c_2=c_3$=32, $E=33^3$=35937 nodes, and R=10 Gb/s, the network access capacity becomes 34.5 petabits per second. With J=4, a capacity of the order of one exabits per second ($10^{18}$ bits per second) can be realized.

Time Locking

Time locking enables the treatment of a network as a single switch by providing a means for accounting for the differential propagation delays, which may vary spatially and temporally. A first node X is said to be time locked to a second node Y along a given path if, at any instant of time, the reading of a time counter at node X equals the sum of a reading of an identical time counter at node Y and the propagation time, normalized to the time-counter period, along the given path from node X to node Y. The time counters at nodes X and Y have the same period. There may be several paths connecting the first node X to the second node Y, and the paths may be defined by individual wavelength channels in a fiber link or several fiber links. Due to the difference in propagation delays of different paths connecting the same node pair, time locking must be realized for the different paths individually. Due to dispersion, time locking of individual wavelength channels within the same WDM link may be required. When a first node is time locked to a second node along a given path, the given path is said to be time-locked. Time-locking must be activated periodically, every second for example, to follow possible propagation-delay variation with time due to environmental reasons.

Time-locking can be realized through an exchange of time-counter readings between an edge-node controller and a connector controller. Time-counter readings, together with other control data, may be carried in-band, alongside payload data destined to sink nodes. The transmission of each time-counter reading must be timed to arrive at a corresponding connector during a designated time interval.

Thus, time locking an edge node to an optical connector means that a time counter at the edge node is time locked to a time counter at the optical connector. A time counter at an edge node is preferably an up-counter and a time-counter at an optical connector is preferably a down counter, the two counters have the same cycle duration. Using a 28-bit time counter, for example, driven by a clock of a clock period of 20 nanoseconds, the duration of the time-counter cycle would be about 5.37 seconds ($2^{28}$ times 20 nanoseconds). The reading of an up-counter at an edge node increases, with each clock trigger, from 0 to 268,435,455 (0 to $2^{28}-1$) and the reading of a time counter at an optical connector decreases, with each clock trigger, from 268,435,455 to 0. If the edge-node controller sends a timing message, when its reading is $K_1$, to an optical connector, and the reading of the down-counter of the optical connector at the instant of receiving the timing message is $K_2$, then the edge-node controller must reset its up-counter to zero when the up-counter reading reaches $[K_2+K_1]$ modulo $2^B$, B being the wordlength of the time counter (B=28 in the above example). If $K_2+K_1=2^B-1$, the edge node is already time locked to the optical connector.

Routing Methods

In a method of routing known as hop-by-hop routing, each node stores a preferred succeeding node or a set of succeeding nodes towards each sink node (destination node). Each node then forwards a connection request to one of the designated succeeding nodes towards a specified sink node. It is well known that providing, at any node, more than one succeeding node towards a destination node can result in routing cycles where a connection request relayed from one node to another can traverse a node more than once. Routing cycles can be avoided by enforcing routing restrictions. However, the routing-cycle problem can be avoided altogether by using a source-routing scheme where each source node maintains a set of candidate routes, herein called a route set, to each sink node. This source routing scheme also greatly facilitate service quality control.

The routing function in a telecommunications network can be adapted to allocate the shortest path for each connection. However, under spatial traffic imbalance, shortest routes for some edge-node pairs can be overloaded, and paths of extra hops may be selected. The routing function in a network can be significantly simplified if each edge node stores a route set to each other edge node. A route merit can be determined as a function of the number of hops and the propagation delay along the route. A route description would typically require a record of less than 32 bytes. A route set that contains 8 routes, for example, would consume storage of 256 bytes. In a high-capacity wide-coverage network having 2000 core nodes and 10,000 edge nodes with each edge node having an access capacity in the order of a terabits per second for example, each edge node would have to store 9999 route sets, requiring about 2.5 megabytes of memory. Thus, even in a network having a capacity of ten petabits-per-second (10,000 edge nodes each having an access capacity in the order of 1 Tb/s), the required storage of route-set information would be reasonable. The routes of a route set can be presorted according to some merit criterion and used accordingly in real-time route selection. A route in a route set may be marked as unavailable when any of its hops is disabled.

Route-Set Formation

Figure 21:
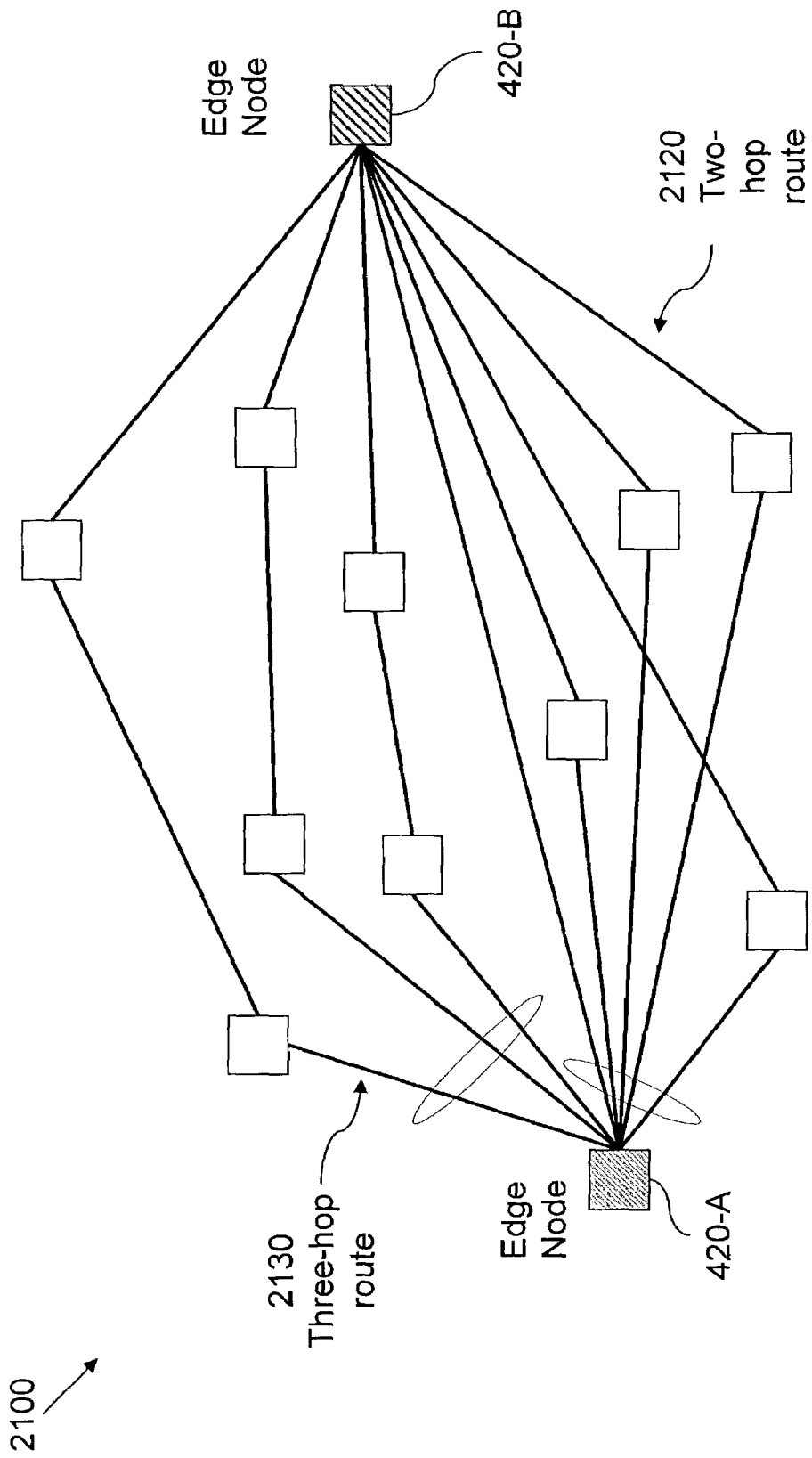
FIG. 21 illustrates a prior art directed route set for an edge-node pair, for use in an embodiment of the present invention.

A route comprises at least one link. A route set from edge node 420A to edge node 420B is illustrated in FIG. 21. The illustrated route set includes a direct path, two-link paths 2120, and three-link paths 2130. A route merit can be determined as a function of the number of links and the propagation delay along the route. As described above, a route description would typically require a record of less than 32 bytes and the memory required at each edge node to store descriptions of a route set to each other node in a 10,000-node network, for example, would be of the order of a few megabytes.

Route sets are directional in the sense that the set of candidate routes in a route set from a first node to a second node and the set of candidate routes in a route set from the second node to the first route may not coincide. The number of candidate routes in the two route sets may differ, and the traversed intermediate nodes, if any, may also differ.

The data rate of a route set of an edge-node pair is the rate of data transmitted from the source edge node to the sink edge node of the route set. The data-rate upper bound for the route set is the lesser of the outbound capacity of the source edge node of the edge-node pair and the inbound capacity of the sink edge node. The outbound capacity of the source edge node is the combined capacity of its outbound ports and the inbound capacity of the sink edge node is the combined capacity of its inbound ports.

The routes of a route set may have common links with routes of other route sets. Thus, a link may carry traffic data belonging to several edge node pairs. For a given route, the link having the lowest capacity is called the critical link of the route, and the capacity of a route is defined herein as the capacity of its critical link. If it is desired to reduce the storage requirement for the route sets at an edge node, each of selected route sets may be allocated a small number of routes. The collective capacity of routes in a route set for a directed node pair comprising a source node and a sink node may be selected to be a function of an estimated extreme value of the data rate for the route set. For example, if an extreme-value estimate of the traffic is 100 megabits per second, then limiting the routes in the route set to include two routes each having a total capacity of 20 Gigabits per second would suffice, even though the data-rate upper bound for the route set may be of the order of a terabit per second. An extreme-value estimate is a value that would be exceeded with a negligible probability; 0.001 for example. The size of a route set may be limited to a relatively-small number of candidate routes to reduce storage-capacity requirement, particularly in a case where an edge node exchanges data at a high bit rate with a relatively-small number of other edge nodes and data at an insignificant bit rate with the majority of other edge nodes.

The computation of a route set need not be performed-in real-time. A generating route set for an edge-node pair may first be determined then a reduced route set is selected. The generating route set may have a sufficiently-large number of routes, with a combined route capacity comparable to the data-rate upper bound for the route set. The routes are determined and sorted according to merit, as described above. A reduced route set may then be formed by selecting a subset of routes of high merit having a reduced combined capacity that is still significantly higher than an estimated extreme value of the data rate from the source edge node to the sink edge node.

Each edge node 1016 in the network of FIG. 10 (420 in FIG. 4) is adapted to interface with core connectors 1040 and 1140 that may include static connectors having fixed input side to output side connectivity and adaptive connectors that modify input side to output side connectivity according to traffic-load variation. To interface with adaptive core connectors, an edge node is adapted to time-lock to each adaptive connector.

In order to differentiate routes in a route set, an edge node may be adapted to compute differential one-way propagation delays along candidate routes leading to a specified sink node. Each edge node may include a propagation-delay-measurement module that exchanges timing messages with propagation-delay-measurement modules of other edge nodes.

Propagation Delay

The propagation delay along a route may be used to classify the routes within a route set. A route from an edge node 420A to an edge node 420B need not be complemented with a route in the reverse direction from edge node 420B to edge node 420A and where a reverse route exists it need not follow the same physical path. Thus, a simple round-trip delay measurement between a source edge node 420A and a sink edge node 420B may not be useful in estimating the one-way propagation delay from edge node 420A to edge node 420B. The one-way propagation delay from one node to another can not reliably be determined from a measurement of round-trip delay.

In order to measure the propagation delay along the routes of a route set, each edge node 420 would be provided with a cyclic time counter, and the time counters of all edge nodes 420 are driven at the same clock rate and have the same period. The period is preferably significantly higher than the largest propagation delay for any edge-node pair in the network. However, the cycles of the time counters across the network are not necessarily coordinated; there may be time shifts of unknown values, among the instants of zero readings of the time counters. One-way delay measurement can therefore be difficult to determine.

For the purpose of classifying the routes in a route set, measuring the differential delay among the routes should suffice. The differential-delay measurement can be performed using a simple procedure where an edge node 420A sends a timing message, which includes a reading of a time counter, along each route in the route set associated with a given destination edge node 420B at pre-selected instants $t_1$, $t_2$, etc. At each intermediate node, the instant of receiving a timing message is recorded and the message is queued for access to an outgoing link leading to the subsequent intermediate node of the respective route. The waiting time at each intermediate node can be determined and added to a corresponding field in the timing message. At the sink node 420B, the arrival time of each timing message is recorded then reduced by the amount of cumulative queueing delay to determine the propagation delay and the result is sent back to the originating edge node 420A.

Figure 22:
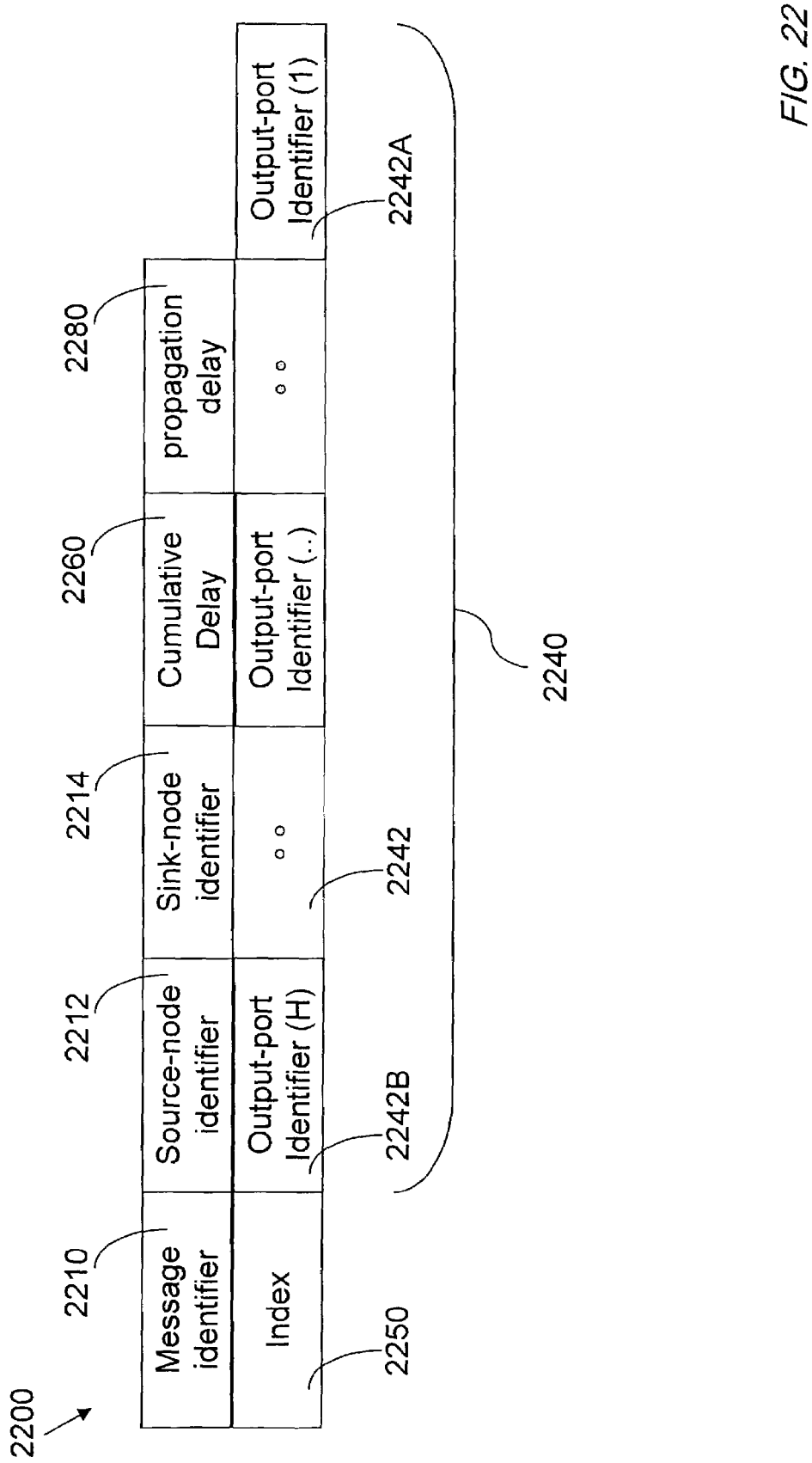
FIG. 22 illustrates the structure of a timing message used for measurement of differential one-way propagation delay within a route set, in accordance with an embodiment of the present invention.

An exemplary timing message 2200, illustrated in FIG. 22, propagates along a route under consideration and is returned to the source node of the route under consideration. A timing message 2200 includes the fields described below.

Field 2210 contains a message identifier. The message identifier enables the 15 source node to relate the updated timing messages returned by the sink node to the routes of the route set.

Field 2212 contains an identifier of the source node of the route under consideration.

Field 2214 contains an identifier of the sink node of the route under consideration.

Field 2240 includes a number of records 2242 equal to the number of nodes traversed by the route under consideration, including the source node and the sink node. Thus, field 2240 defines the route under consideration. The route is defined by an identifier of an output port in each node traversed by the route. Each of the records 2242 contains an identifier of an output port in a node traversed by the route.

Field 2250 is an index that points to a record 2242 holding the output-port identifier of a current node along the route. The records 2242 for consecutive nodes along the route are stored in sequential positions towards the index field 2250. When the timing message 2200 is received by an intermediate node, the index in field 2250 is reduced by one to point to a preceding record 2242, and when the index corresponds to the first record 2242B, which has a fixed location in message 2200, the receiving node realizes that it is the intended destination, i.e., the sink node, and hence computes the one-way propagation delay and writes the result in field 2280. The sink node may either send the message back to the source node, which computes the differential propagation delays for the route set under consideration, or compute the differential propagation delays for the route set under consideration and send the results back to the source node. If the sink node computes the differential propagation delays, the sink node must have means for determining that the source node has completed sending the timing messages 2200 for the route set. It is simpler, therefore, to compute the differential propagation delays at the source node. The number of traversed nodes varies from one route to another, hence it is preferable to let the last record 2242A, at the tail of the timing message 2200, store the identifier of the output port in the source node 420A, and initialize the pointer in field 2250 to correspond to the last record 2242A. The delay along the return path from the sink node 420B to the source edge node 420A of the route under consideration is irrelevant as long as it is not excessive.

Field 2260 is used for recording the cumulative queueing delay along the route under consideration. This field is updated at each node traversed by the route under consideration.

Field 2280 contains the computed one-way propagation delay along the route. This value is computed at the sink node and returned to the source edge node identified in field 2212. The computed value includes an unknown offset of the time counters at the source node and sink node.

The propagation delay indicated in field 2280 and computed by a destination node of a route is the sum of the actual propagation delay along the route plus the offset of the time counter at the destination sink node 420B with respect to the time counter at the source edge node 420A. When two or more routes in a route set are considered, there is always one more unknown than time measurements and, hence, the actual values of the propagation delays along the routes can not be determined. The differential propagation delays are, instead, used to compare the routes in a route set.

Accuracy of Time Measurements

The time measurements required for time locking, as described earlier, must be precise, with an error tolerance of 32 nanoseconds for example, in order to reduce the required guard-time between successive time slots. The time-measurement required to estimate the differential propagation delays along the routes of a given route set are used only to differentiate routes within a route set and, therefore, may be estimated within an error tolerance of several microseconds. If a bufferless core connector comprises a fast switch, and a time sharing scheme such as TDM is used, each edge node subtending to the core connector must be time-locked to the core connector. Time counters are used for this purpose as described in the aforementioned Applicant's U.S. patent application Ser. No. 09/286,431. The period of the clock driving the time counter must be sufficiently small to reduce the guard time between successive time slots in a TDM scheme or successive bursts in a burst-switching scheme. Using a 28-bit time counter with a clock period of 16 nanoseconds yields a time counter period of $16 \times 2^{28}$ nanoseconds, i.e., about 4.19 seconds. For the purpose of computing the one-way propagation delay along the routes of a route set, a coarse time unit of about one microsecond, for example, would suffice. Thus, it would be sufficient to use the 22 most-significant-bits of the time counter reading in computing the one-way propagation delays for the purpose of route classification. The entire time-counter reading (28 bits), used for time locking, indicates time in fine time units of 16 nanoseconds each and the truncated time-counter reading, used for propagation-delay measurement, expresses time in coarse time units of $16 \times 2^6$ nanoseconds, i.e., about one microsecond, each.

Differential-Propagation-Delay Measurement

Figure 23:
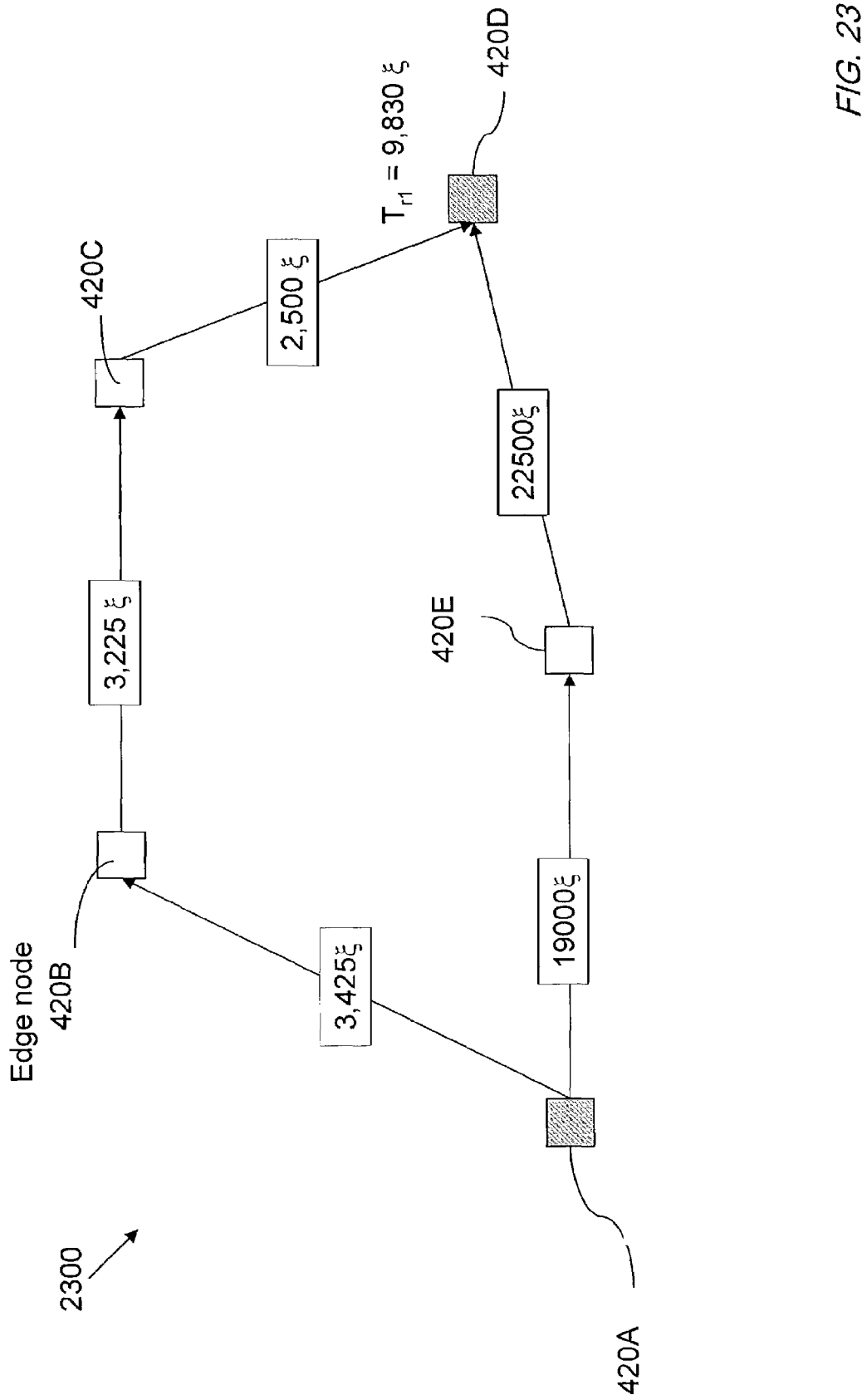
FIG. 23 illustrates the calculation of differential propagation delays for two routes in a route set, in accordance with an embodiment of the present invention.

FIG. 23 illustrates the differential-delay measurement by means of an example. The time unit used, denoted $\xi$, is a coarse time unit of 1.024 microseconds. The route set from source edge node 420A to sink edge node 420D includes a route through two intermediate nodes 420B and 420C. Nodes 420A, 420B, 420C, and 420D are interconnected by bufferless optical connectors (not illustrated in FIG. 23). The source node 420A starts placing the timing messages in respective output-port queues at cyclic time zero of its time counter. At the source edge node 420A, messages 2200 to be sent to a destination edge node 420D of a route set are queued for transmission along the individual routes. In this example, source edge node 420A sends a timing message 2200 towards edge node 420B when the time-counter reading at 420A is Ts=320 $\xi$. This value, 320 $\xi$, is the queueing delay at the source node and is written in field 2260 of the message before the message is sent. Node 420B receives the timing message 2200 with an indication in cumulative-queueing-delay field 2260 that the cumulative delay is 320 $\xi$ and forwards the message 2200 to node 420C after a queueing delay of 200 $\xi$. The queueing delay of 200 $\xi$ is added to the content, 320, of field 2260; yielding 520. Node 420C queues the message for an interval of 160 $\xi$ before forwarding it to the destination node 420D and adds the queueing delay to the current content of field 2260, yielding 680 $\xi$. With each hop, the index in field 2250 is decreased by one. When node 420D receives the message 2200, the content of field 2240 (record 2242) indicates that node 420D is the intended destination node for the route. The reading of the time counter at node 420D, when the timing message 2200 is received is $T_r$=9830 $\xi$. Node 420D subtracts the cumulative queueing delay 680 $\xi$ from the value $T_r$ to yield a relative propagation delay of 9,150 $\xi$. This value 9,150 $\xi$ includes an unknown offset of the time counter at node 420D with respect to the time counter at node 420A.

As illustrated in FIG. 23, the propagation delay along the links 420A-420B, 420B-420C, and 420C-420D are 3425 $\xi$, 3225 $\xi$, and 2500 $\xi$ (adding up to 9150 $\xi$), $\xi$ being a coarse time unit; approximately one microsecond in this example.

A second timing message is launched at node 420A along a second route belonging to the same route set from 420A to 420D. The message was sent at sending time $T_s$=625 $\xi$, and encountered a queueing delay along intermediate nodes so that the content of cumulative-queueing-delay field 2260 when the second timing message is received at node 420D is 1100 $\xi$. The message 2200 is received at node 420D at receiving time $T_r$=5,800 $\xi$. Node 420D then determines the difference between $T_r$ and the cumulative queueing delay 1,100 $\xi$ as 4,700 $\xi$.

Neither of the two results 9,150 nor 4,700 $\xi$ ($\xi$ is about a microsecond) represents an actual propagation delay. The offset time between the time counters at node 420A and 420D is not known, and hence all that can be determined is that the propagation delay along the first route is higher than that along the second route by 9,150 $\xi$-4,700 $\xi$=4,450 $\xi$.

As described earlier, all time counters have the same period and the same number of coarse timing units. A course time unit is 1.024 microseconds in the example of FIG. 23. If the time-counter at node 420D is reset for some reason, with timing messages sent at the same cyclic time as determined by the time counter at node 420A, and the propagation delay plus the queueing delay en route remaining unchanged, the readings of the time counter at 420D, at the instant of receiving the first and second timing messages may become 2846 $\xi$ and 4,192,700 $\xi$, respectively. The differential delay of (4,192,700-2,846)$\xi$ is 4,189,854 $\xi$, which is about 4.19 seconds. This corresponds to an optical-fiber path of 838,000 kilometers, which is too high for a terrestrial network. The excessively large difference is, therefore, interpreted to be a result of the finite wordlength of the time counters at edge nodes 420A and 420D. The result is then corrected by adding the number of coarse time units $\xi$ per time-counter cycle, i.e., $2^{22}$ (4,194,304), to the first reading 2846 and the propagation delay along the first route is then determined to be higher than that of the second route by 2846+4,194,304-4,192,700=4,450 $\xi$. This corresponds to a differential delay of about 4.45 milliseconds, i.e., the first route has a transmission path that is about 890 kilometers longer than that of the second route.

Figure 24:
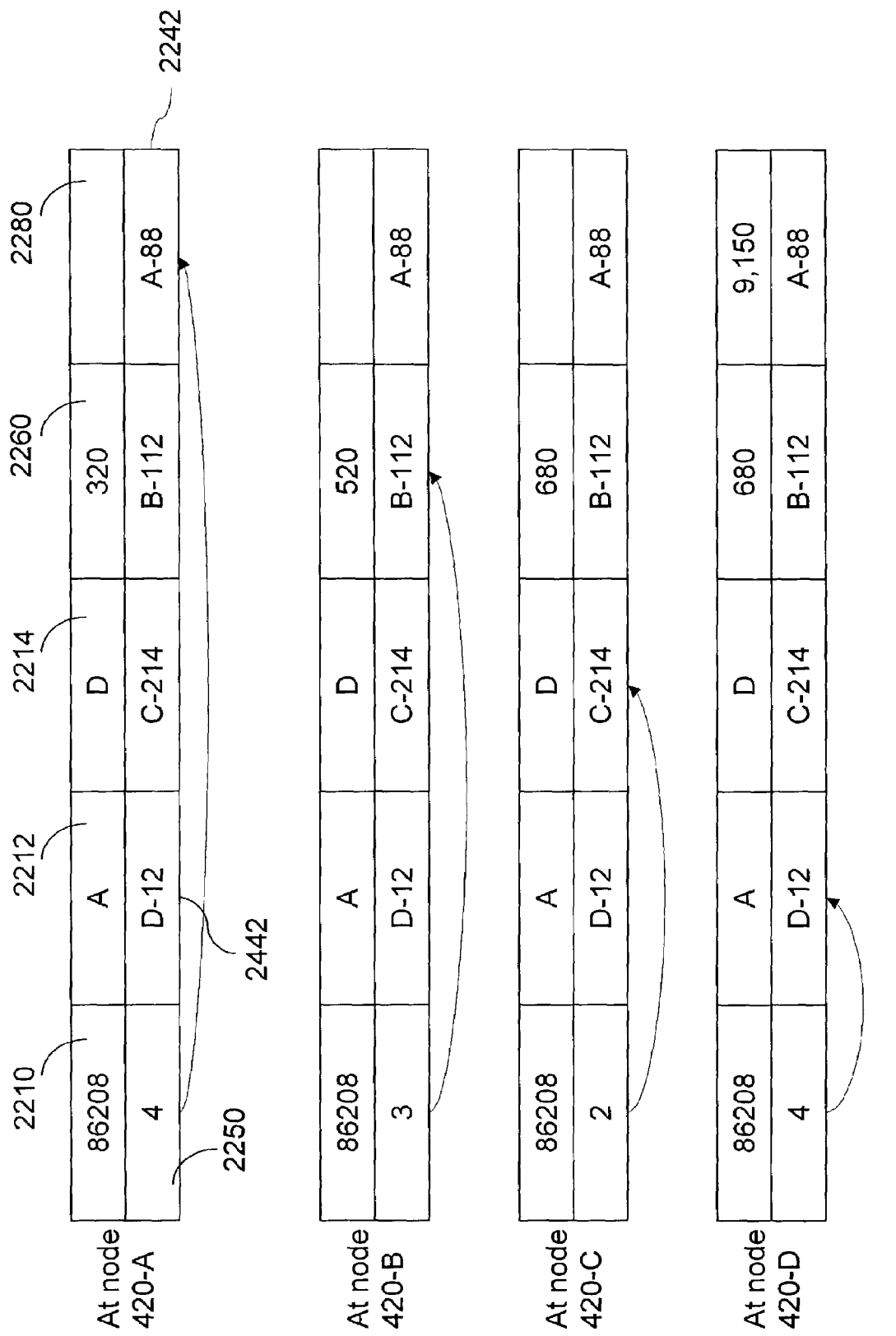
FIG. 24 illustrates the progression of a timing message along one of the two routes illustrated in FIG. 23.

FIG. 24 illustrates the progression of a timing message along the exemplary route of FIG. 23 traversing four nodes 420A, 420B, 429C, and 420D. At the source node, 420A, index 2250 points to the record 2242 that contains the identifier, A-88, of the output port of node 420A that leads to the next node 420B along the route. The reading of the time counter at node 420A at the instant the message 2200 is transmitted is 320 coarse time units $\xi$. Output port A-88 transmits the timing message to node 420B where it is time stamped upon receipt and queued for transmission to the subsequent node 420C. Node 420B inspects the index in field 2250 and determines that node 420B is not the sink node. The index in field 2250 now points to output port B-112 of node 420B that leads to node 420C. The message is transmitted from port B-112 after a queueing and processing delay within node 420B of 200 $\xi$. Before transmitting the timing message to node 420C, output port B-112 adds 200 to the current content of field 2260 to result in 520 and reduces the value of the index in field 2250 to point to a record 2242 corresponding to node 420C. At node 420C, the message is time stamped upon receipt and the output port leading to node 420D is identified as output port C-214. Node 420C determines, by inspecting the value of the index in field 2250 that node 420C is not the sink node. The message is delayed 160 $\xi$ at node 420C and output port C-214 adds this delay to the current content of field 2260, to result in 680, reduces the index in field 2250 to point to the record 2242 corresponding to node 420D and transmits the modified timing message to node 420D. The message is time stamped upon receipt at node 420D. Node 420D inspects the value of the index in field 2250 and determines that node 420D is the sink node. The time-counter reading at node 420D at the instant of receiving the timing message is 9,830. Node 420D subtracts the content of field 2260, i.e., 680, from the time counter reading 9,830, to yield the one-way propagation delay of 9,150 coarse time units $\xi$ along the route from node 420A to node 420D.

Likewise, another message 2220 is transmitted along each other route in the route set designated for source node 420A and sink node 420D.

In summary, advances in optical and electronic technology have eliminated the need for complex structures and complex controls of telecommunication networks. A versatile network scaling to a capacity of the order of several petabits per second is now realizable using simple network structures. The limitations that have led to the complexity and inefficiency of current data networks have now been traversed. Adopting a simple network structure would enable the introduction of advanced communication services. The disclosed structure, illustrated in FIGS. 10, 11, 16, and 17 is only exemplary. Several other simple structures, based on an optical core, can be devised.

Other modifications will be apparent to those skilled in the art and, therefore, the invention is defined in the claims.

What is claimed is:

1. A network comprising:
   a plurality of edge nodes interconnected by a backbone core and an auxiliary core, said backbone core comprising a first set of wavelength-division-multiplexed links and a plurality of primary optical connectors, said auxiliary core comprising a second set of wavelength-division-multiplexed links and a plurality of secondary optical connectors; and
   a controller associated with each of said edge nodes, each controller comprising:
      a route-selection module for selecting candidate routes from said each of said edge nodes to any other of said edge nodes;
      a first time-locking module for sending time locking signals from said each of said edge nodes to at least one of said secondary optical connectors;
      a propagation-delay-measurement module for determining relative propagation delays along said candidate routes; and
      a first connection-scheduling module for scheduling transfer of signals from an input side to an output side of said each of said edge nodes;
   wherein said backbone core provides, for each edge node, at least one backbone path having a bounded number of links to each other edge node, and said auxiliary core provides, for at least one edge node, at least one auxiliary path to at least one other edge node.

2. The network of claim 1 wherein said route-selection module at a first edge node maintains a description of a set of routes to a second edge node.

3. The network of claim 2 wherein said first time-locking module comprises a time counter and means for communicating a reading of said time counter to external nodes.

4. The network of claim 3 wherein said propagation-delay-measurement module exchanges time-measurements with at least another propagation-delay-measurement module and estimates the differential propagation delay along any two routes in said set of routes.

5. The network of claim 4 wherein said time-measurements are derived from said time counter.

6. The network of claim 3 wherein said first connection-scheduling module is a fine time-slot scheduling module for scheduling fine time slots in at least one time frame for each of said signals.

7. The network of claim 1 further including a second controller associated with each of said secondary optical connectors, each second controller comprising
   a second time-locking module for exchanging time locking signals with at least one of said edge nodes; and
   a second connection-scheduling module for scheduling connections from an input side to an output side of said each of said secondary optical connectors.

8. The network of claim 7 wherein said second connection-scheduling module is a coarse time-slot scheduling module for scheduling coarse time slots in at least one time frame for each of said connections.

9. The network of claim 6 wherein said first connection-scheduling module schedules $\Omega_1$ connections per second, the value of $\Omega_1$ determined according to the inequality $$\Omega_1 \geq (C \times T)/(\Psi \times R \times \delta)$$

where
   C is a total capacity in bits per second of a switching fabric of said each of said edge nodes expressed in bits per second;
   T is a duration of each of said at least one time frame in seconds;
   $\Psi$ is a mean combined duration of said at least one time frame in seconds;
   R is a channel capacity expressed in bits per second; and
   $\delta$ is a duration in seconds of a fine time slot.

10. The network of claim 8 wherein said second connection-scheduling module schedules $\Omega_2$ connections per second, the value of $\Omega_2$ determined according to the inequality $$\Omega_2 \geq (C^* \times T)/(\Psi \times R \times \Delta)$$

where
   $C^*$ is a total capacity of a switching fabric of said each of said secondary optical connectors expressed in bits per second;
   T is a duration of each of said at least one time frame in seconds;
   $\Psi$ is a mean combined duration of said at least one time frame in seconds;
   R is a channel capacity expressed in bits per second; and
   $\Delta$ is a duration in seconds of a coarse time slot.

11. The network of claim 1 wherein at least one primary optical connector from among said plurality of primary optical connectors is a static wavelength router comprising arrayed-waveguide-grating demultiplexers and multiplexers.

12. The network of claim 1 wherein said plurality of secondary optical connectors includes at least one optical channel switch.

13. The network of claim 1 wherein said plurality of secondary optical connectors includes at least one optical time-division-multiplexed switch.

14. The network of claim 13 wherein each of said edge nodes has a plurality of input ports and a plurality of output ports and wherein
   data received at each input port is segmented in narrow segments of equal sizes, and
   data transmitted from each output port is structured in wide segments each of which contains an integer-multiple of narrow segments.

15. A backbone network comprising:
   a plurality of edge nodes arranged in a recursive structure of edge-node groups, said recursive structure having a connectivity order not exceeding an integer J where the integer J is greater than zero and each edge node constitutes a zero-order group, and
   a plurality of connectors arranged into J sets of connectors, each connector in a $j^{th}$ set of connectors, $1 \leq j \leq J$, having a number $m_j$ of input ports and $m_j$ output ports, $m_j > 1$;
   wherein
      edge-node groups of order (j−1), $0 < j \leq J$, are interconnected by connectors of connector-set j to form an edge-node group of order j so that each edge node has j non-overlapping paths each traversing (j-1) intermediate edge nodes to each other edge node in any other (j-1)$^{th}$-order group, and
additional $$\left[\left(\sum_{k=1}^{j} m_k\right) - 2 \times j\right]$$

non-overlapping paths each traversing j intermediate edge nodes to said each other edge node in any other (j-1)$^{th}$-order group
and wherein
at least one connector is an arrayed-waveguide-grating wavelength router.

16. The backbone network of claim 15 wherein the number of edge nodes in an edge-node group of order J does not exceed the product $$\prod_{j=1}^{J} m_j,$$

$m_j$ being said number of input ports of a connector in a connector set j, $1 \leq j \leq J$.

17. The backbone network of claim 15 wherein at least one connector is an optical channel switch.

18. The backbone network of claim 15 wherein at least one connector is an optical switch adapted to switch time-slotted optical signals arranged in a time frame.

19. The backbone network of claim 15 wherein said integer J is determined from $$\prod_{j=1}^{J-1} m_j < v \leq \prod_{j=1}^{J} m_j$$

where ν is a total number of edge nodes in said plurality of edge nodes $m_j$ is said number of input ports of said each connector in a connector set j, $1 \leq j \leq J$, $v > m_1$, and $J > 1$.

* * * * *

UNITED STATES PATENT AND TRADEMARK OFFICE
CERTIFICATE OF CORRECTION

PATENT NO. : 7,450,845 B2  Page 1 of 1
APPLICATION NO. : 10/316557
DATED : November 11, 2008
INVENTOR(S) : Maged E. Beshai It is certified that error appears in the above-identified patent and that said Letters Patent is hereby corrected as shown below:

On the Title Page, should read

Item (75) Sole Inventor: Maged E. Beshai, Sittsville (CA)

Signed and Sealed this

Fourth Day of August, 2009

JOHN DOLL
*Acting Director of the United States Patent and Trademark Office*